United States Patent [19]
Nagai et al.

[11] Patent Number: 6,057,609
[45] Date of Patent: May 2, 2000

[54] AUXILIARY POWER SUPPLY APPARATUS

[75] Inventors: Tamiji Nagai; Kazuo Yamazaki, both of Kanagawa; Sumio Iwase, Tokyo, all of Japan

[73] Assignee: Sony Corporation, Tokyo, Japan

[21] Appl. No.: 09/069,540

[22] Filed: Apr. 30, 1998

[30] Foreign Application Priority Data

May 7, 1997 [JP] Japan ..................................... 9-116748

[51] Int. Cl.⁷ ....................................................... H02J 7/00
[52] U.S. Cl. .................................. 307/66; 307/80; 307/85
[58] Field of Search ................................. 307/43, 44, 64, 307/65, 66, 80, 85, 86, 87

[56] References Cited

U.S. PATENT DOCUMENTS

| | | | |
|---|---|---|---|
| 5,324,990 | 6/1994 | Cunningham | 307/125 |
| 5,565,714 | 10/1996 | Cunningham | 307/112 |
| 5,567,996 | 10/1996 | Yu | 307/125 |
| 5,583,384 | 12/1996 | Henry | 307/113 |
| 5,642,002 | 6/1997 | Mekanik et al. | 307/64 |

*Primary Examiner*—Jeffrey Gaffin
*Assistant Examiner*—Jonathan Kaplan
*Attorney, Agent, or Firm*—Jay H. Majoli

[57] ABSTRACT

The AC electric power of the commercial AC power supply is safely supplied to an electronic appliance functioning as a load during an occurrence of a power interruption by an auxiliary power supply apparatus. In the auxiliary power supply apparatus, normally usable electric power derived from a diode bridge energized by the commercial AC power supply, and auxiliary electric power produced from a DC/DC converter energized by a cell are selectively conducted to an output connector of this auxiliary power supply apparatus via a selection switch and a load connection switch, which are controlled in response to a detection result of a power-interrupt detecting circuit. When an AC plug of a load set is inserted into this output connector, a switch is turned ON, and then, a DC voltage applied from a voltage divider to this connector is changed, depending upon the types of the power supply circuits employed in the load sets, namely, a transformer type power supply circuit and a switching type power supply circuit. This voltage change is detected by a voltage/gradient detecting circuit, so that the load connection switch is turned ON only for the switching type load set. A modem apparatus and the like may be continuously operated.

5 Claims, 16 Drawing Sheets

6,057,609

AUXILIARY POWER SUPPLY APPARATUS

BACKGROUND OF THE INVENTION

The present invention generally relates to an auxiliary power supply apparatus capable of supplying electric power to electronic appliances during an interruption of the electric power. More specifically, the present invention is directed to a compact auxiliary (spare) power supply apparatus capable of supplying electric power in a high efficiency.

In general, as represented in FIG. 1, a transformer type power supply circuit is conventionally employed in an electric appliance adapted to the commercial AC power supply. Very recently, a switching type power supply circuit as shown in FIG. 2 is usually employed, since this switching type power supply circuit can be made compact and in light weight.

In an electronic appliance 10T of the transformer type power supply as indicated in FIG. 1, an AC plug 11 is connected via a power supply switch 13 to a primary winding 12p of a power supply transformer 12, anodes of rectifier diodes D1 and D2 are connected to both ends of a secondary winding 12s, and a center tap of the secondary winding 12s is connected to the ground. A cathode of the rectifier diode D1 is commonly connected to a cathode of the rectifier diode D2. A smoothing capacitor Cl is connected between the commonly-connected cathodes and ground, and also an electronic circuit 19 indicated in the form of a resistor is connected between the commonly-connected cathodes and ground.

In the electronic appliance 10T of FIG. 1, when the AC plug 11 is inserted into a plug socket (not shown) of the commercial AC power supply, and the power supply switch 13 is turned ON, an AC voltage having a predetermined value, which is induced between the secondary winding 12s of the power supply transformer 12, is rectified by the diodes D1 and D2 in the full wave mode, so that a DC voltage having a preselected value is applied to the electronic circuit 19.

On the other hand, in an electronic appliance 10S of the switching type power supply, as represented in FIG. 2, an output terminal of a negative polarity side of a diode bridge 14 connected via the power supply switch 13 to the AC plug 11 is connected to the ground. Both one end of a smoothing capacitor C2, and one end of a primary winding 15p of a switching transformer 15 are connected to another output terminal of a positive polarity side of the diode bridge 14. The other end of the capacitor C2 is connected to ground, and further both a source-to-drain path of a field-effect transistor (FET) 16, and a cathode-to-anode of a diode D3 are parallel-connected between the other end of the primary winding 15p and ground. Also, the output from a PWM signal generating circuit 17 is supplied to a gate of the field-effect transistor 16.

An anode of a rectifier diode D4 is connected to one end of a secondary winding 15s of the switching transformer 15, and the other end of the secondary winding 15s is connected to ground. A smoothing capacitor C3 is connected between a cathode of the rectifier diode D4 and the ground, and also the electronic circuit 19 indicated in the form of the resistor is connected between them.

It should be noted that an initiation processing circuit 18 for initiating the PWM signal generating circuit 17 is employed. This initiation processing circuit 18 supplies the DC output of the diode bridge 14 via, for instance, a resistor having a proper value, to the PWM signal generating circuit 17. Additionally, this initiation processing circuit 18 performs the known initiation process, namely, since the DC output derived from the diode bridge 14 is supplied to this initiation processing circuit 18, the PWM signal generating circuit 17 is initiated, and thereafter, the initiation processing circuit 18 rectifies an output of a third winding provided with the switching transformer 15, and switches the DC output of the diode bridge 14 to this rectified output, so that the rectified output of the third winding is supplied.

In the electronic appliances 10S of FIG. 2, when the AC plug 11 is inserted into a plug socket (not shown in detail) of the commercial AC power supply, if the power switch 13 is turned ON, then the commercial AC is directly rectified in the full wave mode by the diode bridge 14. For example, when the voltage of the commercial AC is 100V, this AC voltage is converted into a DC voltage having approximately 140V under peak condition, and a DC voltage having approximately 120V under loaded condition. This DC voltage is applied via the primary winding 15p of the switching transformer 15 to the drain of the field-effect transistor 16 whose source is grounded. At the same time, the PWM signal derived from the PWM signal generating circuit 17 is supplied to the gate of this field effect transistor 16, so that a drain current is interrupted, the PWM signal having a predetermined voltage, which is induced across the secondary winding 15s of the switching transformer 15, is rectified in a half-wave mode by the diode D4, and thus a DC voltage having a preselected value is applied to the electronic circuit 19.

When a power interruption happens to occur in the commercial AC power supply, the electronic appliances 10T and 10S equipped with the power supply circuits adapted to the commercial AC power supply as indicated in FIG. 1 and FIG. 2 cannot be used. Therefore, conventionally, a DC-to-AC type auxiliary (spare) power supply apparatus 20 as indicated in FIG. 3 is utilized in order to be prepared for unpredictable power interruption.

In the auxiliary power supply apparatus 20 of FIG. 3, a dual-polarity/dual-switch (2-circuit/2-contact) type selection switch 23 is interposed between an AC plug 21 and a plug socket type output connector 22, fixed contacts on a side "a" of this selection switch 23 and a side "d" thereof are connected to the AC plug 21, and further movable contacts on a side "c" of this selection switch 23 and a side "f" thereof are connected to an output connector 22.

Also, a DC voltage derived from a cell 24 is converted by a DC/AC inverter 25 into an auxiliary AC voltage of, for instance, 100V in 50 Hz, or 60 Hz, and this auxiliary AC voltage is applied to the fixed contacts (side "b" and side "e") of the switch 23.

Then, a power-interrupt detecting circuit 26 is connected to the AC plug 21, and also an output from this power-interrupt detecting circuit 26 is supplied as a control signal for an initiation operation and a switching operation to the DC/AC inverter 25 and the selection switch 23.

It should also be noted that as the cell 24, for example, a secondary battery having a specification of approximately 6V - 2 Ah is employed with respect to a load in a 5-W class, and is properly charged by a charging circuit 27.

Normally, in the auxiliary power supply apparatus 20 of FIG. 3, the selection switch 23 is connected as indicated by a solid line. Thus, the commercial AC power is conducted from the AC plug 21 to the output connector 22, and then is supplied to the electronic appliance as indicated in FIG. 1, or FIG. 2, which is connected to this output connector 22.

When a power interruption happens to occur in the commercial AC power supply, the selection switch 23 is switched as indicated by a dotted line, and also the DC/AC inverter 25 is initiated in response to the output from the power-interrupt circuit 26. As a result, the auxiliary AC power derived from the DC/AC inverter 25 is conducted to the electronic appliance connected to this output connector 22. As a consequence, the normal operations of these electronic appliances can be maintained even when the power interruption happens to occur.

The DC/AC inverter 25 is mounted on the auxiliary power supply apparatus 20 shown in FIG. 3, which is capable of outputting the AC power for the auxiliary purposes to any one of the electronic appliance 10T equipped with the transformer type power supply, as indicated in FIG. 1, and also of the electronic appliance 10S equipped with the switching type power supply, as represented in FIG. 2.

However, since the operation frequency of this DC/AC inverter 25 is equal to the frequency of the commercial AC power supply, i.e., 50 Hz, or 60 Hz, there is a problem that the efficiency of this DC/AC inverter 25 is lowered, and further the dimension of this DC/AC inverter 25 is increased.

To solve only this efficiency problem, the following solution may be conceived. That is, both a DC/AC inverter adaptable to an electronic appliance of a transformer type power supply and a DC/DC converter adaptable for an electronic appliance of a switching type power supply are mounted on an auxiliary power supply apparatus, and then any one of these DC/AC inverter and DC/DC converter may be selectively used in accordance with a type of a power supply circuit for a load set. However, this solution owns another problem that such a conceived auxiliary power supply apparatus would become bulky, and would have a cost problem.

SUMMARY OF THE INVENTION

The present invention has been made to solve these problems, and therefore, has an object to provide a compact auxiliary power supply apparatus capable of firmly and safely applying electric power to an electronic appliance while a power interruption happens to occur.

To achieve the over-noted objects, the present invention provides an auxiliary power supply that can provide power for an electrical apparatus during a time when the normal AC power is interrupted, regardless of whether the main power is provided by a transformer-type power supply or a switching-type power supply.

According to one aspect of the present invention, the auxiliary power supply includes a capacitor connected across the DC outputs of a diode bridge that is connected to the AC power, and the voltage across the capacitor is monitored by a power interrupt detector to detect any power interruption. A DC cell forming an auxiliary battery and a DC/DC convertor are used to provide an auxiliary voltage applied to one set of input terminals of a selector switch, with the diode bridge connected to another set of input terminals of the selector switch. The power interrupt detector turns on the DC/DC convertor and also operates the selector switch when power interruption is detected.

The DC/DC convertor uses a pulse width modulation (PWM) generator driving a field-effect transistor (FET) that is also connected to a step-up transformer that is connected in series with the auxiliary battery and ground. A load judging circuit is included so that the auxiliary battery is not put into service if there is no load connected to the output connector. The selection switch is controlled by the power interrupt detector to connect the output of the DC/DC convertor to the load when an AC power interrupt is detected.

In accordance with another aspect of the present invention, the auxiliary power supply includes a switching transformer connected between the diode bridge and the selector switch. The switching transformer is controlled or switched to provide the auxiliary AC power by a first DC/DC convertor that operates during normal operation when the AC power is not interrupted. AC power interruption is sensed by the power interrupt detector and in which case a second DC/DC convertor including the auxiliary battery is connected to the selector switch for operation just as in the above-described first aspect of the invention.

According to another aspect of the present invention, the voltage during changeover from the AC power to the auxiliary battery power is made less abrupt by using a series connection of another capacitor and a discharge preventing diode connected across the DC terminals of the diode bridge. Another selector switch is provided that connects the second capacitor to the first selector switch output when an interruption in the AC power is detected.

In accordance with another aspect of the present invention, the selector switch is eliminated and a third winding is provided on the switching transformer that is connected to one DC output of the diode bridge, wherein the third winding is connected to a step-up transformer and through a switch to the auxiliary battery. The switching transformer is driven or switched by a first DC/DC convertor that operates during the normal provision of the AC power, and when an AC power interruption is detected a second auxiliary DC/DC converter is connected to drive or switch the step-up transformer connected as described hereinabove to provide the auxiliary AC power to the load.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

Referring now to FIG. 4 to FIG. 8, a description will be made of an auxiliary power supply apparatus according to a first embodiment mode of the present invention.
[ARRANGEMENT OF FIRST EMBODIMENT]

Figure 4:
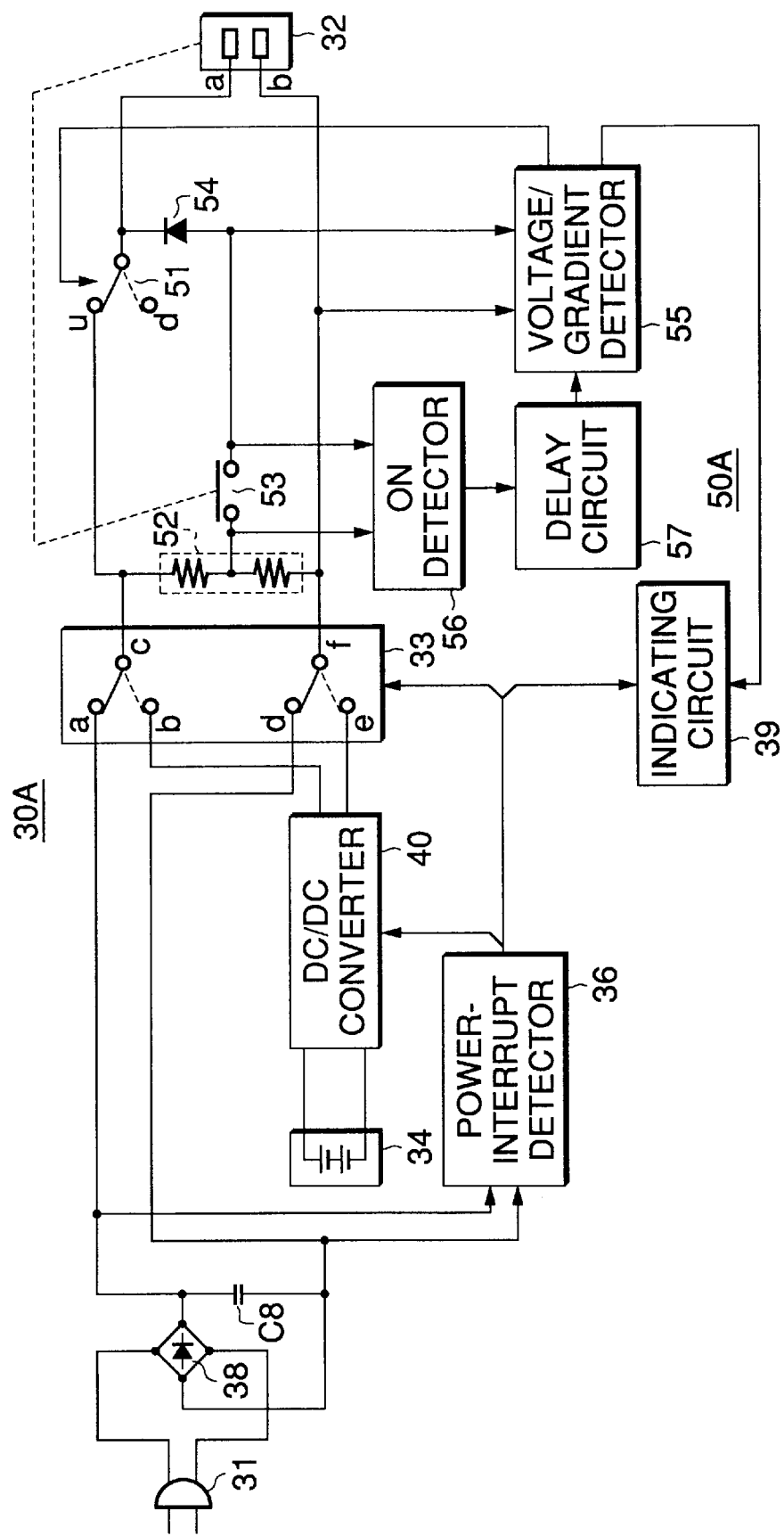
FIG. 4 is a block diagram for schematically showing an entire arrangement of an auxiliary power supply apparatus according to a first embodiment mode of the present invention.
Figure 5:
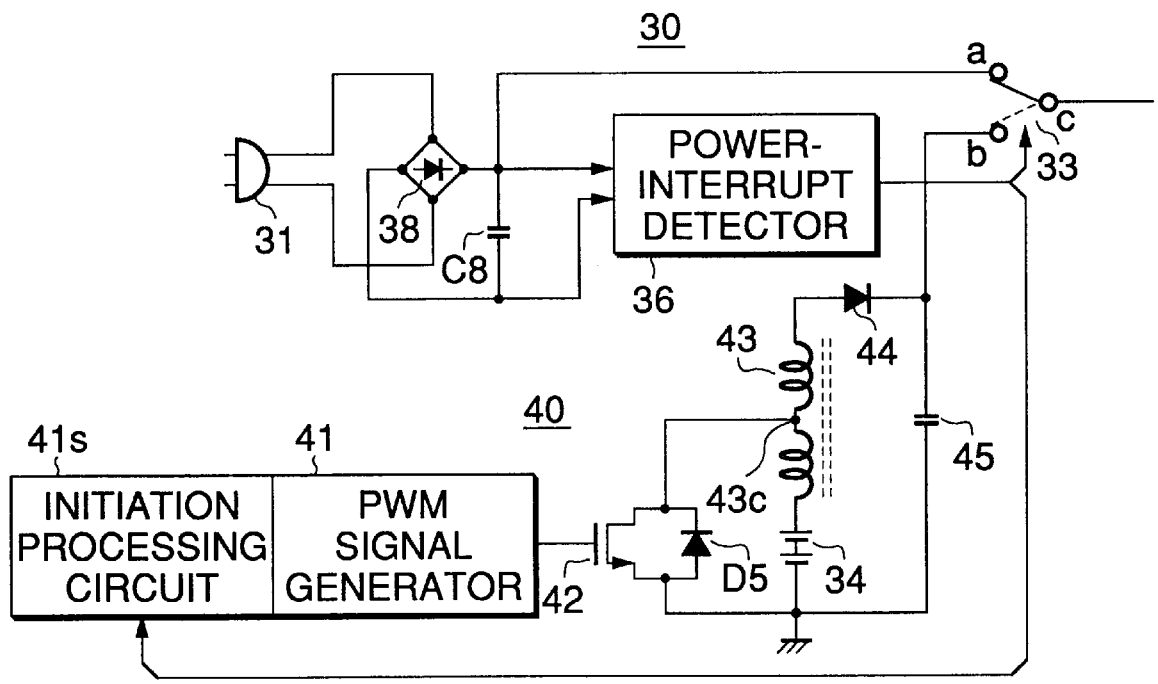
FIG. 5 is a block diagram for schematically indicating an arrangement of a major circuit portion of this auxiliary power supply apparatus shown in FIG. 4.

An overall circuit arrangement of the auxiliary (spare) power supply apparatus according to the first embodiment of the present invention is indicated in FIG. 4, and a circuit arrangement of a major circuit portion thereof is shown in FIG. 5.

In an auxiliary power supply apparatus 30A of FIG. 4, an AC input terminal of a diode bridge 38 is connected to an AC plug 31, and a DC output terminal of this diode bridge 38 is connected to a fixed contact of a side "a" of a dual-polarity/dual-switch (2-circuit/2-contact) type selection switch 33 and another fixed contact of a side "d" thereof.

Figure 3:
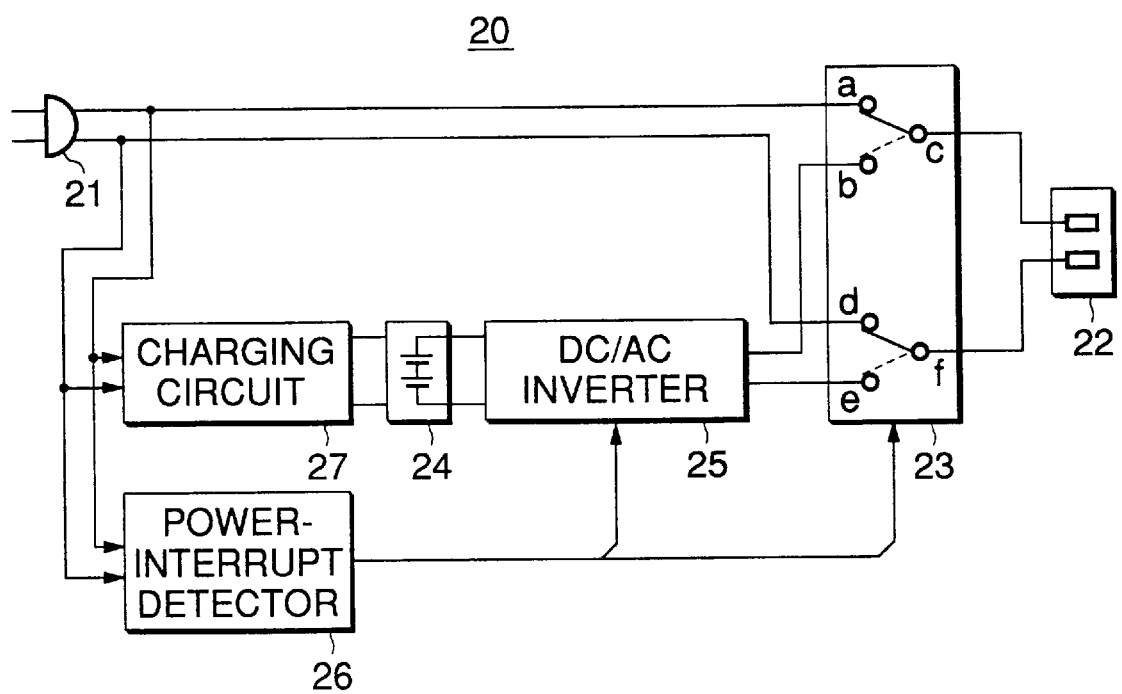
FIG. 3 is a schematic block diagram for indicating the structural example of the conventional auxiliary power supply apparatus.

In the first embodiment of FIG. 4, a DC-to-DC converter 40 for an auxiliary purpose is employed, instead of the DC/AC inverter 25 of the above-explained auxiliary power supply apparatus 20 shown in FIG. 3. A DC voltage derived from the cell 34 is DC/DC-converted into an auxiliary DC voltage having, for instance, approximately 120V under loaded condition, and this auxiliary DC voltage is applied to fixed contacts of a side "b" and a side "e" of the selection switch 33.

Also, both a smoothing capacitor C8 and a power-interrupt detecting circuit 36 are connected to the DC output terminal of the diode bridge 38. A detection signal from this power-interrupt detecting circuit 36 is supplied as control signals for switching operation, display operation, and initiation operation to the selection switch 33, a display element 39, and the DC/DC converter 40, respectively.

The DC/DC converter 40 employed in this first embodiment is arranged by, as indicated in FIG. 5, containing a PWM (pulse width modulation) signal generating circuit 41 combined with an initiation processing circuit 41s, a field-effect transistor (FET) 42 having a gate to which a PWM signal is supplied from this PWM signal generating circuit 41, and a step-up transformer 43 which constitutes a load of the field-effect transistor 42 whose source is grounded. This DC/DC converter 40 is further arranged by a diode 44 for rectifying an output voltage from this step-up transformer 43, and a smoothing capacitor 45. The power from the secondary battery 34 is supplied via a center tap 43c of the step-up transformer 43.

It should be understood that a drain-to-source path of the field-effect transistor 42 is connected in parallel to a cathode-to-anode path of the diode D5.

In this embodiment, a load judging circuit 50A is provided. A u-sided fixed contact of a load connection switch 51 is connected to the c-sided fixed contact of the selection switch 33, a movable contact of the connection switch 51 is connected to an a-sided terminal of a plug-socket type output connector 32, and an f-sided movable contact of the selection switch 33 is connected to a b-sided terminal of the output connector 32. It should also be noted that a d-sided fixed contact of the connection switch 51 is not connected to any point.

A resistor voltage divider 52 is connected between the c-sided movable contact and the f-sided movable contact of the selection switch 33, and both a normally-open switch 53 and a diode 54 are series-connected between a center point of this voltage divider 52 and the a-sided terminal of the output connector 32.

A voltage/gradient detecting circuit 55 is connected to a connection center point between the normally-open switch 53 and the diode 54, and also to the b-sided terminal of the output connector 32, and an ON detecting circuit 56 is connected to both ends of the normally-open switch 53. An output from this ON detecting circuit 56 is supplied via a delay circuit 57 to the voltage/gradient detecting circuit 55. Then, an output from the voltage/gradient detecting circuit 55 is supplied as a control signal to the load connection switch 51 and the display element 39.

It should be understood that the power-interrupt detecting circuit 36, the voltage/gradient detecting circuit 55, and the ON detecting circuit 56 may be realized by a microcomputer (not shown).
[LOAD JUDGING/POWER-SUPPLY SWITCHING PROCESS OPERATION OF FIRST EMBODIMENT]

Figure 6:
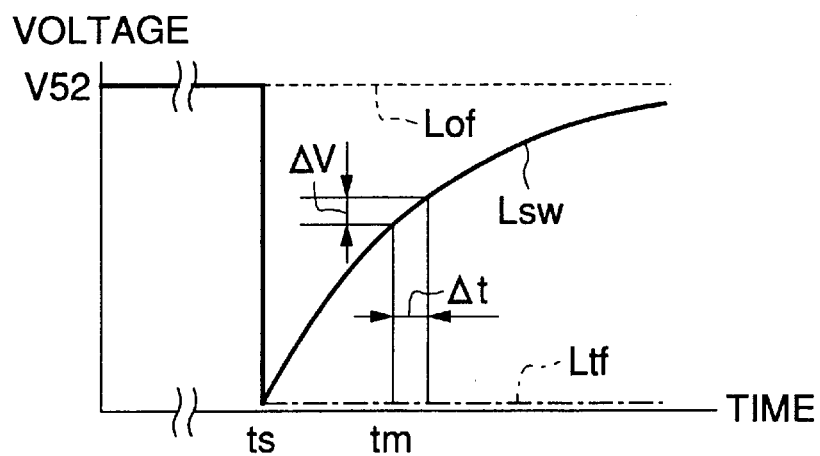
FIG. 6 shows a waveform diagram for explaining operations of another major circuit portion of this auxiliary power supply apparatus indicated in FIG. 4.
Figure 7:
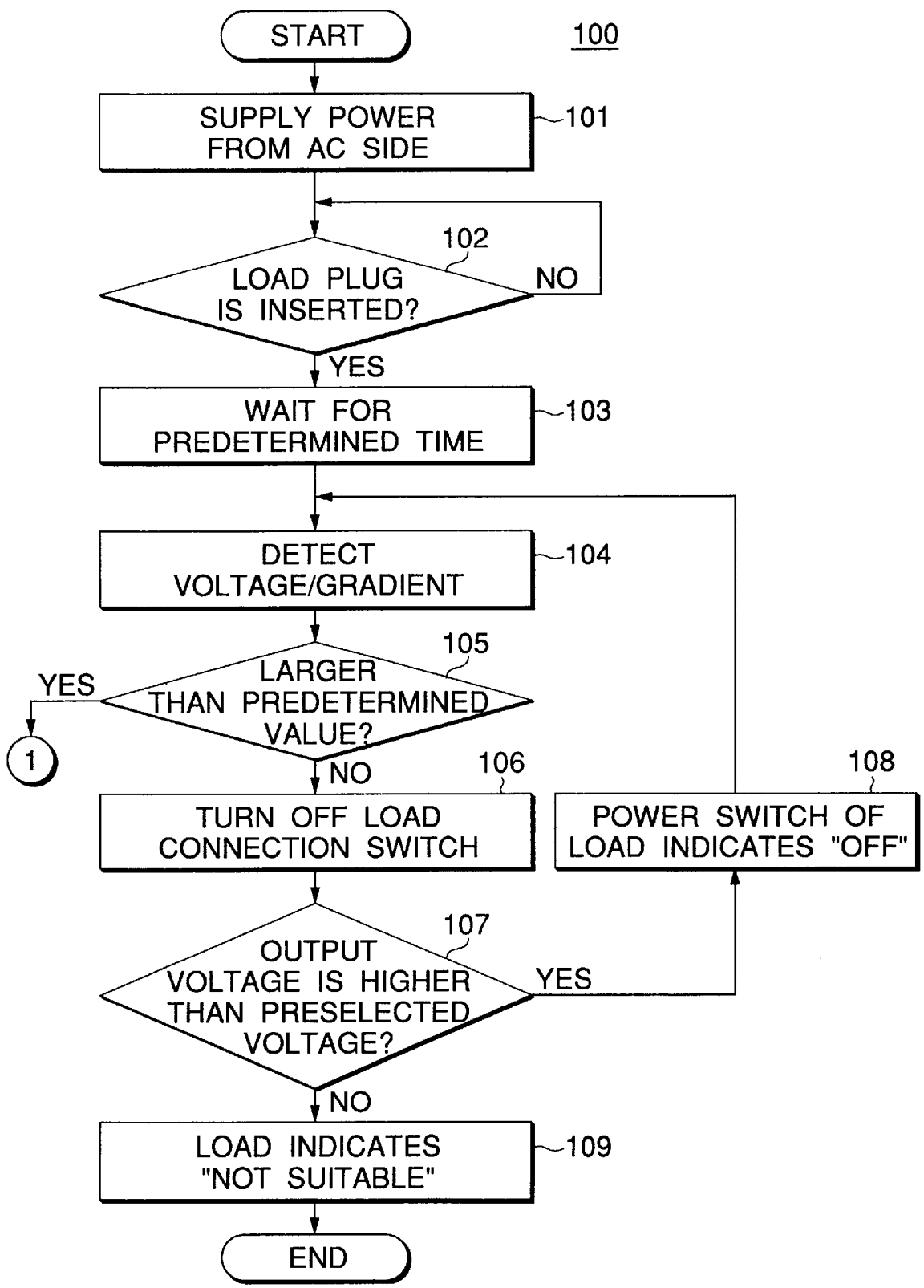
FIG. 7 is a flow chart for describing a load judging/power-supply switching process operation of the first embodiment shown in FIG. 4.
Figure 8:
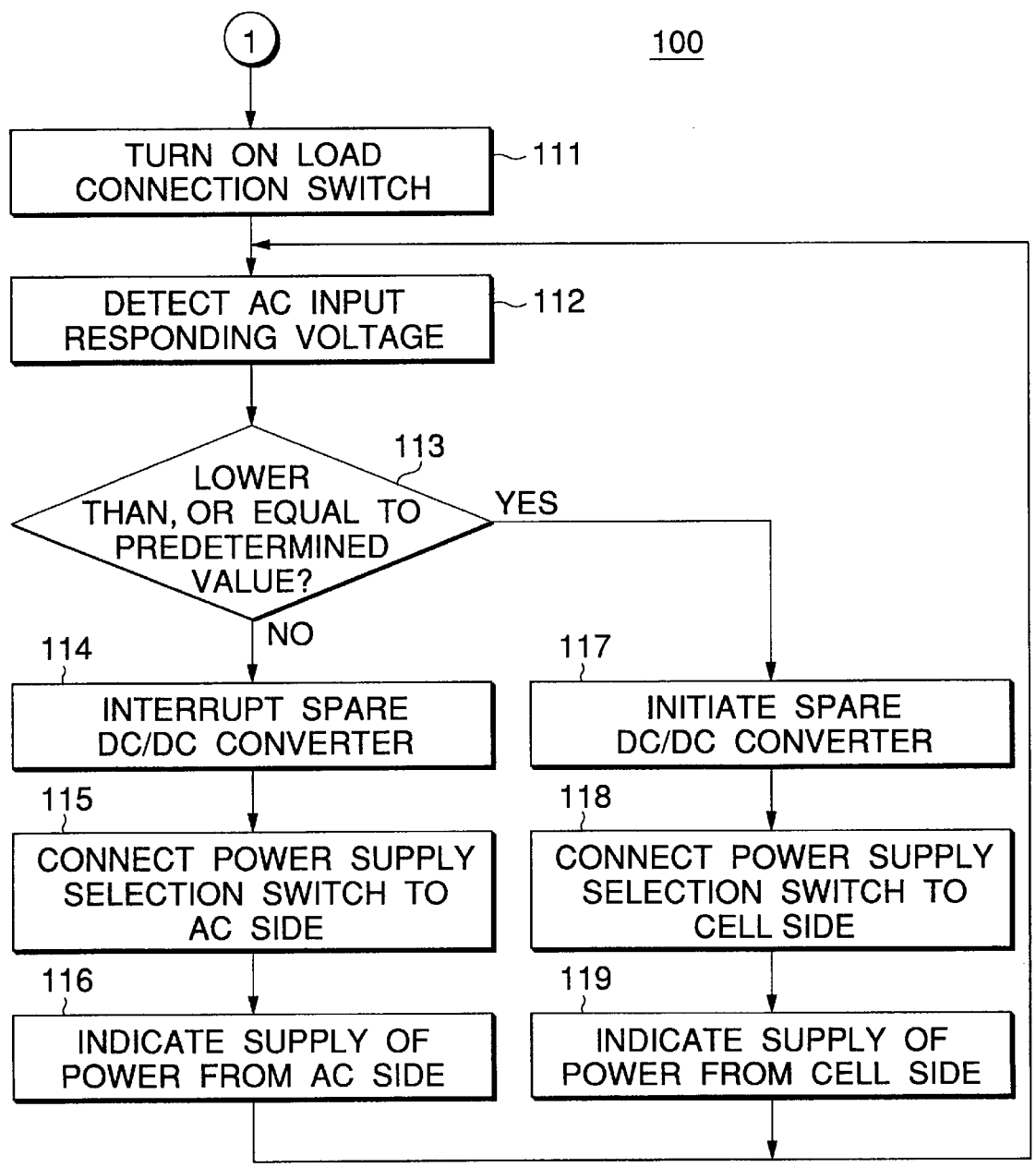
FIG. 8 is a flow chart for describing another load judging/power-supply switching process operation of the first embodiment shown in FIG. 4.

Referring also to FIG. 6 to FIG. 8, the load judging/power-supply switching process operation according to the first embodiment of the present invention will now be explained.

Under an initial condition, it is now assumed that the selection switch 33 is connected as represented by a solid line in FIG. 4, the load connection switch 51 is connected by a dotted line in FIG. 4, and the normally-open switch 53 is set to the OFF state.

A load judging/power-supply switching process routine 100, as indicated in flow charts of FIG. 7 and FIG. 8, is started when the AC plug 31 of the auxiliary power supply apparatus 30 shown in FIG. 4 is inserted into the plug socket (not shown) of the commercial AC power supply.

Figure 1:
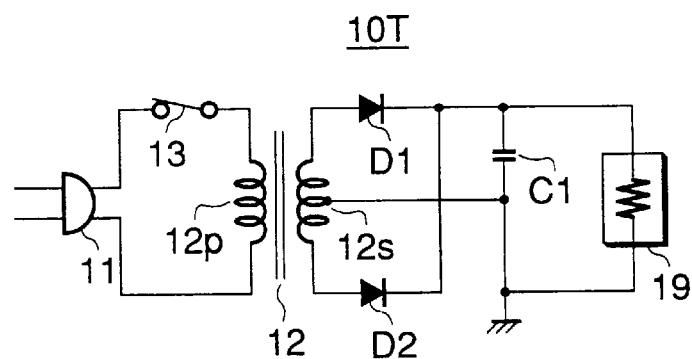
FIG. 1 is a circuit diagram for explaining a basic idea of the present invention.
Figure 2:
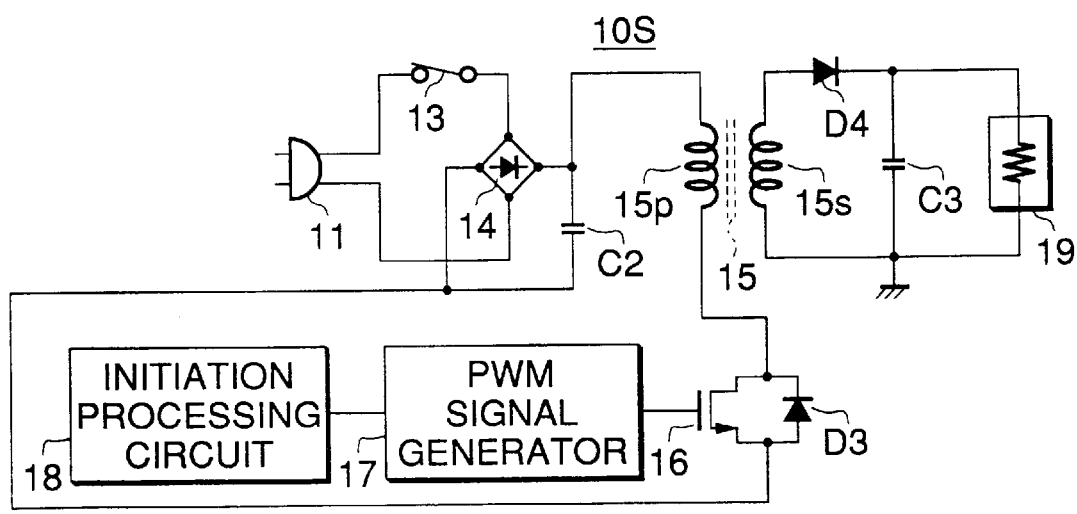
FIG. 2 is a circuit diagram for explaining a basic idea of the present invention.

At a first step 101, the electric power is supplied from the AC side. At the next step 102, as indicated in FIG. 1, or FIG. 2, such a fact as to whether or not the AC plug of the load set is inserted into the output connector 32 may be judged by detecting the ON-state of the normally-open switch 53 which is mechanically coupled to this output connector 32.

When the AC plug of the load set is inserted into the output connector 32, this load judging/power-supply switching process operation is advanced to a further step 103 at which a waiting operation is performed only for predetermined time ("ts" to "tm"). Thereafter, at the subsequent step 104, a voltage gradient of an output voltage V52 from the resistor voltage divider 52 is detected.

When the AC plug of the load set is inserted into the output connector 32 at a time instant "ts" of FIG. 6, in the case that the electronic appliance (namely, 10S of FIG. 2) equipped with the switching type power supply is selected as the load, the voltage V52 is gradually increased with a gradient $\Delta V/\Delta t$, since the capacitor C2 is charged. This voltage V52 is once rapidly lowered and is changed with a time elapse, as indicated by a solid line "Lsw" in FIG. 6.

On the other hand, when the electronic appliance (namely 10T of FIG. 1) equipped with the transformer type power supply is selected as the load, since an input resistance value thereof is very low, as indicated in a dash line "Ltf" of FIG. 6, the voltage V52 is rapidly lowered and this lowered voltage is maintained. It should be understood that even when either the switching type power supply or the transformer type power supply is employed as the load, if the power supply switch of the electronic appliance functioning as the load is turned OFF, then the voltage V52 is not changed from the initial value thereof, as represented in a broken line "Lof" of FIG. 6.

As a consequence, when the judgment is made as to whether or not the gradient of the voltage V52 is larger than, or equal to a predetermined value at a step 105, if the gradient of this voltage V52 is not larger than, or equal to a predetermined value, then the process operation is advanced to a step 106. At this step 106, the load connection switch 51 is turned OFF. Thereafter, at the next step 107, another judgment is made as to whether or not the voltage V52 of the resistor voltage divider 52 is higher than, or equal to a predetermined value.

At the step 107, when the output voltage V52 of the resistor voltage divider 52 is higher than, or equal to a predetermined value, the process operation is advanced to a further step 108. At this step 108, such a fact that the power supply switch of the load is turned OFF is displayed. Thereafter, the process operation is returned to the previous step 104. This indication is performed by, for instance, flickering a green light.

Conversely, when the output voltage V52 of the resistor voltage divider 52 is not higher than, or equal to a predetermined value at the step 107, the process operation is advanced to a step 109. At this step 109, such an indication is made that while the power supply of the load corresponds to the transformer type power supply, this power supply is not adapted, or suitable to the auxiliary power supply apparatus 30 according to this embodiment. Then, this load judging/power-supply switching process operation routine 100 is accomplished. This indication is performed by, for example, flickering a red light.

Then, in the case that the gradient of the voltage V52 is larger than, or equal to a predetermined value, the process operation is advanced via a terminal 1 to a step 111 of the flow chart shown in FIG. 8. At this step 111, the load connection switch 51 is turned ON, so that the DC output derived from the diode bridge 38 can be conducted to the output connector 32.

At a further step 112, a terminal voltage across the capacitor C8 in correspondence with the AC input is detected. Then, the process operation is advanced to a step 113 at which a check is made as to whether or not this terminal voltage is lower than, or equal to a preselected value.

In such a case that the terminal voltage of the capacitor C8 (see FIG. 5) is not lower than, or equal to a preselected value at the step 103, namely, when the supply of the electric power from the commercial AC power supply is not interrupted, the process operation is advanced to a step 114. At this step 114, the converting operation of the DC/DC converter 40 (see FIG. 4) is brought into the rest state. At a next step 115, the power supply selection switch 33 is connected to the AC side, as represented in FIG. 4, so that the electric power from the AC side produced by the diode bridge 38 is conducted to the output connector 32. At a further step 116, such an indication that the electric power from the AC side is supplied is made by, for example, continuously turning ON the green light. Thereafter, the process operation is returned to the step S112, and then the process operations defined at the step 113, and the steps 114 to 116 are repeatedly performed.

Also, at the previous step 113, when the voltage corresponding to the AC input is lower than, or equal to a predetermined value, namely when the commercial AC power supply is brought into the power interrupt state, the process operation is advanced to a step 117. At this step 117, the DC/DC converter 40 is initiated, and then at a step 118, the power supply selection switch 33 is connected to the cell side, as indicated by a dotted line of FIG. 4, so that the DC power derived from the cell by the DC/DC converter 40 is conducted to the output connector 32. At a step 119, such an indication that the electric power from the cell side is supplied is made by, for example, continuously turning ON the red light. Thereafter, the process operation is returned to the step 112, and then the process operations defined at the step 113 and the steps 117 to 119 are repeatedly performed.

Then, when the power interruption is recovered, the process operation is returned to above-explained steps 112, 113, and 114 to 116.

In accordance with the above-described first embodiment, the load judging circuit 50A judges as to whether or not the load set is properly connected to the output connector, and the DC electric power is supplied only to such a load set adapted to the power supply circuit. As a consequence, the electric power can be safely and firmly supplied to the suitable electric appliances which constitute the load.

Also, since the switching type DC/DC converter 40 is used during the power interruption, the compact auxiliary power supply apparatus can be operated in a high efficiency.

[ARRANGEMENT OF SECOND EMBODIMENT]

Figure 9:
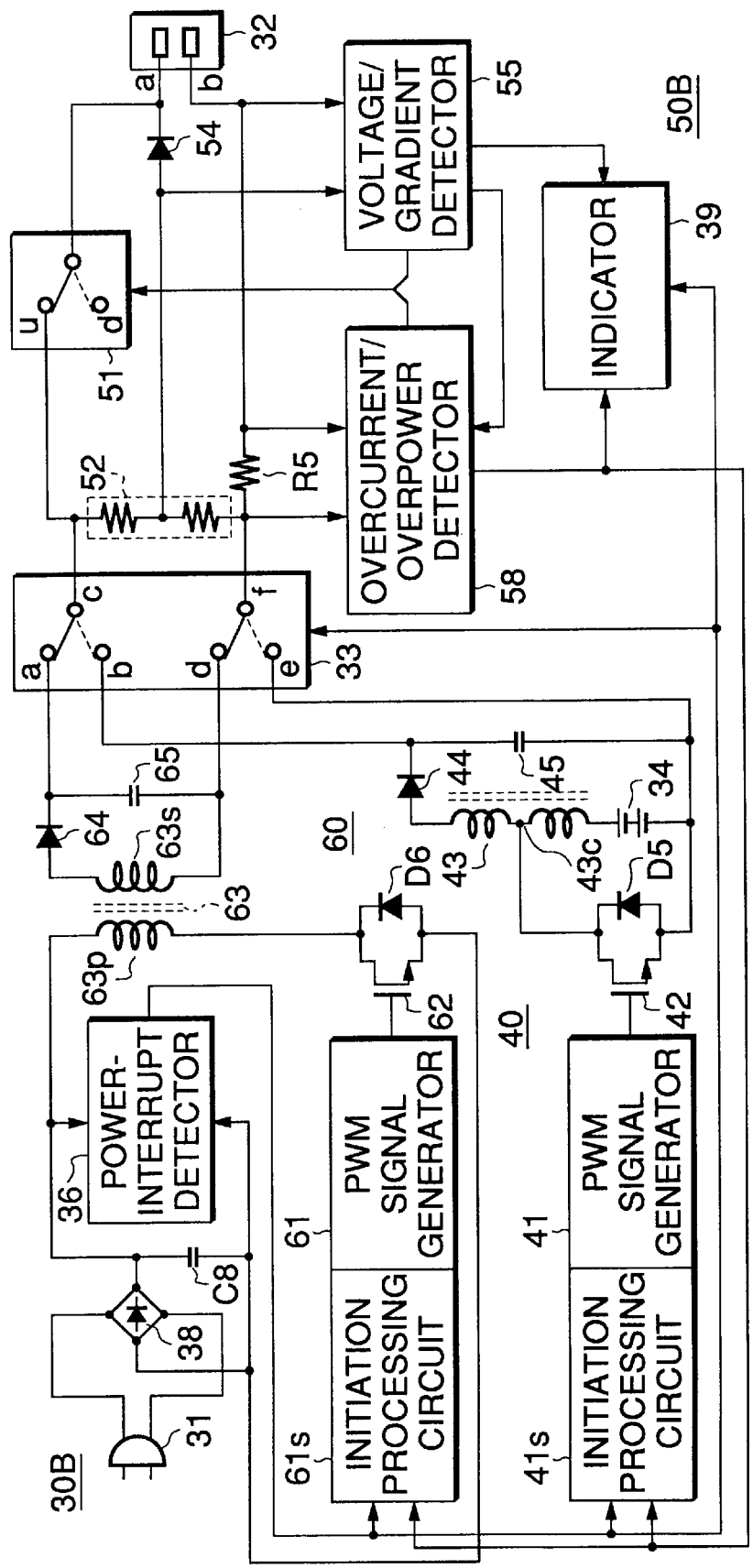
FIG. 9 is a block diagram for schematically representing a circuit arrangement of an auxiliary power supply apparatus according to a second embodiment of the present invention.
Figure 10:
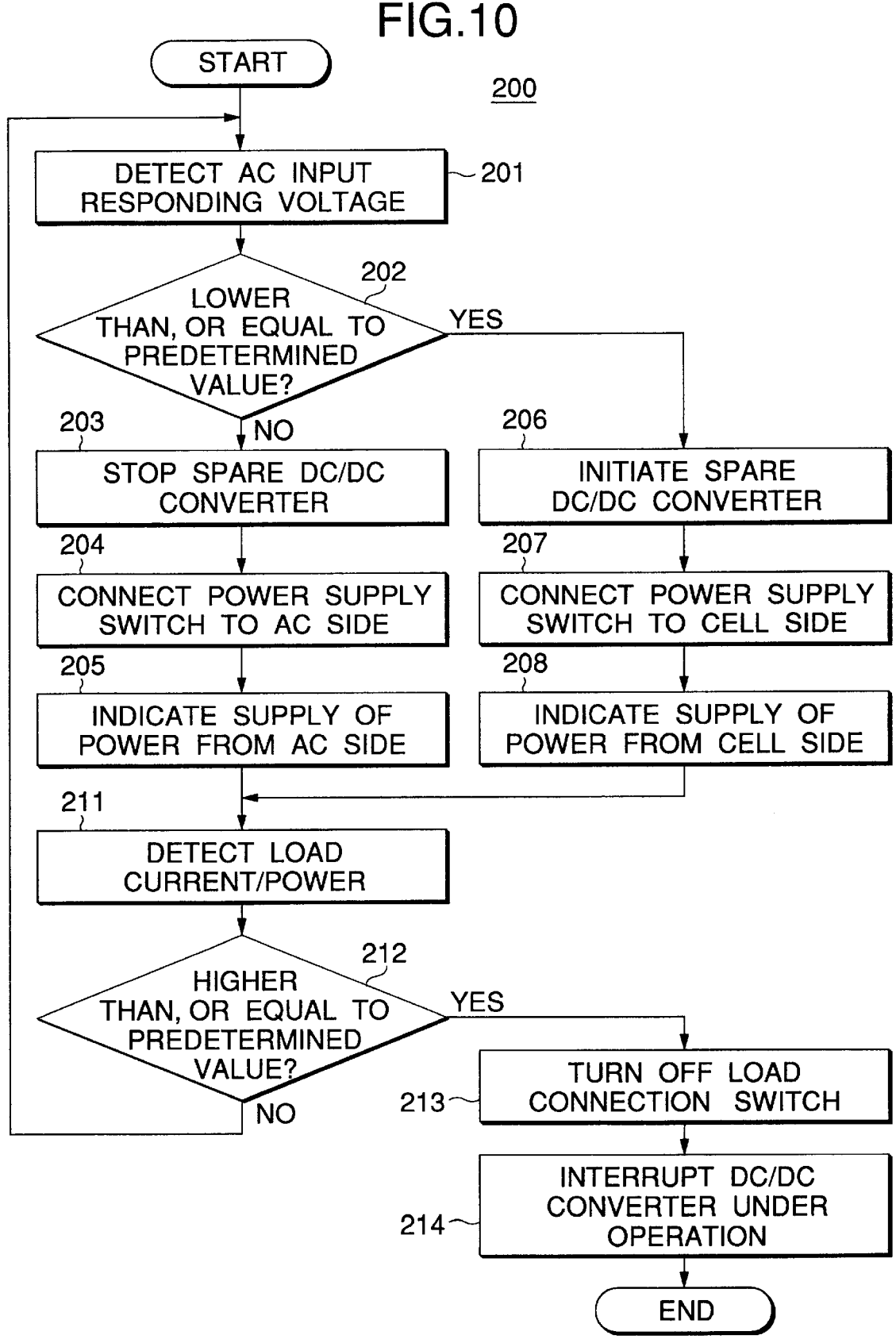
FIG. 10 is a flow chart for explaining a power-supply switching/protecting process operation of the auxiliary power supply apparatus according to the second embodiment.

Referring now to FIG. 9 to FIG. 10, a description will be made of an auxiliary power supply apparatus according to a second embodiment of the present invention.

A circuit arrangement of the auxiliary (spare) power supply apparatus according to the second embodiment of the present invention is indicated in FIG. 9. It should be understood that the same reference numerals shown in FIG. 4 will be employed as those for denoting the same, or similar circuit portions of FIG. 9, and descriptions thereof will be partially omitted.

In an auxiliary power supply apparatus 30B of FIG. 9, the above-explained load judging circuit 50A of the auxiliary power supply apparatus 30 is replaced by a load judging circuit 50B, and a normally operable DC/DC converter 60 is added to the above-explained auxiliary power supply apparatus 30.

In the load judging circuit 50B according to this second embodiment, the normally-open switch 53 is omitted from the above-described load judging circuit 50A shown in FIG. 4, and an overcurrent/overpower detecting circuit 58 is additionally employed. Also, the normally operable DC/DC converter 60 is arranged in a similar manner to the above-explained DC/DC converter 40 for auxiliary purposes, shown in FIG. 5. That is, the step-up transformer 43 of the DC/DC converter 40 for auxiliary purposes is replaced by a switching transformer 63, and further the DC output from the diode bridge 38 is supplied as a power supply.

In other words, in the auxiliary power supply apparatus 30B of FIG. 9, the AC input terminal of the diode bridge 38 is connected to the AC plug 31, whereas the smoothing capacitor C8 and the power-interrupt detecting circuit 36, and further one end of a primary winding 63p of the switching transformer 63 employed in the normally operable DC/DC converter 60 are connected to the DC output terminal of this diode bridge 38.

In the normally operable DC/DC converter 60 according to this second embodiment, the PWM signal generated from the PWM signal generating circuit 61 combined with the initiation processing circuit is supplied to a gate of a field-effect transistor (FET) 62 whose gate is grounded, and a drain of this field-effect transistor 62 is connected to the other end of the primary winding 63p of the switching transformer 63.

It should be noted that the drain-to-source path of the field-effect transistor 62 is connected in parallel to the cathode-to-anode path of the diode D6.

The anode of the rectifier diode 64 is connected to one end of a secondary winding 63s of the switching transformer 63. A smoothing capacitor 65 is connected between the cathode of the rectifier diode 64 and the other end of the secondary winding 63s. Both ends of this capacitor 65 are connected to the a-sided fixed contact and the d-sided fixed contact of the dual-plurality/dual-switch type selection switch 33.

Also, in the DC/DC converter 40 for the auxiliary purpose, the PWM signal generated from the PWM signal generating circuit 41 combined with the initiation processing circuit is supplied to the gate of the field-effect transistor (FET) 42 whose source is grounded, and the drain of this field-effect transistor 42 is connected to the center tap 43c of the step-up transformer 43.

The anode of the rectifier diode 44 is connected to one end of the step-up transformer 43, the secondary battery 34 is connected between the other end of the step-up transformer 43 and the source of the field-effect transistor 42, and further the smoothing capacitor 45 is connected between the cathode of the rectifier diode 44 and the source of the field-effect transistor 42.

Both the b-sided fixed contact and the e-sided fixed contact of the selection switch 33 are connected between the both ends of this smoothing capacitor 45.

Then, in the load judging circuit 50B of the second embodiment, the u-sided fixed contact of the load connection switch 51 is connected to the c-sided movable contact of the selection switch 33, the movable contact of the connection switch 51 is connected to the a-sided terminal of the plug-socket type output connector 32, and the resistor R5 for current detecting is connected between the f-sided movable contact of the selection switch 33 and the b-sided terminal of the output connector 32.

The resistor voltage divider 52 is connected between the c-sided movable contact and the f-sided movable contact of the selection switch 33, and the diode 54 is series-connected between the center point of this voltage divider 52 and the a-sided terminal of the output connector 32.

The voltage/gradient detecting circuit 55 is connected to the center point of the voltage divider 52 and the b-sided terminal of the output connector 32, and the overcurrent/overpower detecting circuit 58 is connected across the resistor R. The detection output from the voltage/gradient detecting circuit 55 is applied to the overcurrent/overpower detecting circuit 58, and both the detecting circuits 55 and 58 are supplied as control signals to the load connection switch 51 and the display element 39.

Also, the output from the power-interrupt detecting circuit 36 is supplied as the control signals for the switching operation, the display operation, and the initiation operation to the selection switch 33, the display element 39, and the auxiliary-purpose and normally operable DC/DC converters 40 and 60. On the other hand, the output of the overcurrent/overpower detecting circuit 58 is supplied as the control signals for the display operation and the initiation operation to the display element 39, and the auxiliary-purpose/normally operable DC/DC converters 40 and 60.

It should be understood that the power-interrupt detecting circuit 36, the voltage/gradient detecting circuit 55, and the overcurrent/overpower detecting circuit 58, according to this second embodiment, may be realized by way of a microcomputer (not shown in detail).

Alternatively, in such a case that the current/voltage characteristic of the auxiliary power supply apparatus 30B represents a trailing characteristic having a sharp gradient over a preselected current value, the output voltage may be detected so as to protect this auxiliary power supply apparatus.

Furthermore, the method for detecting the currents, voltages, or electric power may be varied in the case that the electric power is supplied from the AC side, or the electric power is supplied from the cell.

(POWER SUPPLY SWITCHING/PROTECTING PROCESS OPERATION IN SECOND EMBODIMENT]

Referring also to FIG. 10, the power supply switching/protection process operation according to the second embodiment of the present invention will now be explained.

Under an initial condition, it is now assumed that the selection switch 33 is connected as represented by a solid line in FIG. 9, and the load connection switch 51 is connected by a dotted line in FIG. 9.

Then, when the AC plug 31 of the auxiliary power supply apparatus 30B shown in FIG. 9 is inserted into the plug socket (not shown) of the commercial AC power supply, and also the AC plug of the load set of the switching type power supply is inserted into the output connector 32, as indicated in FIG. 2, the process operations defined at the steps 104, 105, and 111 among the routine 100 shown in FIG. 7 are carried out by the voltage/gradient detecting circuit 55. Then, it is assumed that the load connection switch 51 is switched, as indicated by a solid line of FIG. 9.

When the power supply switching/protection process routine 200 as indicated in FIG. 10 is started, at a first step 201, a terminal voltage of the capacitor C8 in correspondence with the AC input is detected. Then, this process operation is advanced to a step 202 at which a check is made as to whether or not this terminal voltage is lower than, or equal to a predetermined value.

When the terminal voltage across the capacitor C8 is not lower than, or equal to a predetermined value at the step 202, namely when the commercial AC power supply is not brought into the power interrupt state, the process operation is advanced to a step 203. At this step 203, the DC/DC converter 40 for the auxiliary purpose is brought into the rest condition, and the normally operable DC/DC converter 60 is operated.

At the next step 204, the power supply selection switch 33 is connected to the AC side, as indicated by a solid line of FIG. 9, so that such power is conducted to the output connector 32, and this power is produced by rectifying the output from the switching transformer 63 of the DC/DC converter 60 and supplied from the AC side. At a step 205, such a fact that the electric power is supplied from the AC side is indicated by, for example, continuously turning ON the green light.

Conversely, when the voltage corresponding to the AC input is lower than, or equal to a predetermined value, namely when the commercial AC power supply is brought into the power interrupt condition at the step 202, the converting operation of the normally operable DC/DC converter 60 is stopped. As a result, the process operation is advanced to a step 206 at which the DC/DC converter 40 for auxiliary purposes is initiated. At a next step 207, the power supply selection switch 33 is connected to the cell side, as indicated by a dotted line of FIG. 9, so that the DC power derived from the cell by the DC/DC converter 40 for the auxiliary purpose is conducted to the output connector 32. At a step 208, such an indication that the electric power from the cell side is supplied is made by, for example, continuously turning ON the red light.

The process operation is advanced to a step 211 from any of the above-described steps 205 and 208. At this step 211, a load current is detected and electric power is detected. At a next step 212, a check is made as to whether or not the detected current/electric power are larger than, or equal to a predetermined value.

When the detected load current/electric power are not larger than, or equal to a predetermined value at the step 212, namely are within a normal range, the process operation is returned to the step 201 at which the above-explained process operation is repeatedly performed.

When the detected load current/electric power are larger than, or equal to a predetermined value at the step 212, namely exceed the normal range, the process operation is advanced to a step 213 at which the load connection switch 51 is turned OFF. Then, at a next step 214, the operation of either the normally operable DC/DC converter 40 or the DC/DC converter 60 for the auxiliary purpose is stopped. Thus, the power supply switching/protection process routine 200 is accomplished.

In accordance with the above-described second embodiment, the load judging circuit 50B judges as to whether or not the load set is properly connected to the output connector, and the DC electric power is supplied only to such a load set adapted to the power supply circuit. Furthermore, when either the overcurrent or the overpower is detected, the supply of electric power to the load is stopped. As a consequence, the electric power can be safely and firmly supplied to the suitable electric appliances which constitute the load.

Also, since the switching type DC/DC converter 40 for the auxiliary purpose and the normally operable switching type DC/DC converter 60 are used, the compact auxiliary power supply apparatus can be operated in a high efficiency.

[ARRANGEMENT OF THIRD EMBODIMENT]

Figure 11:
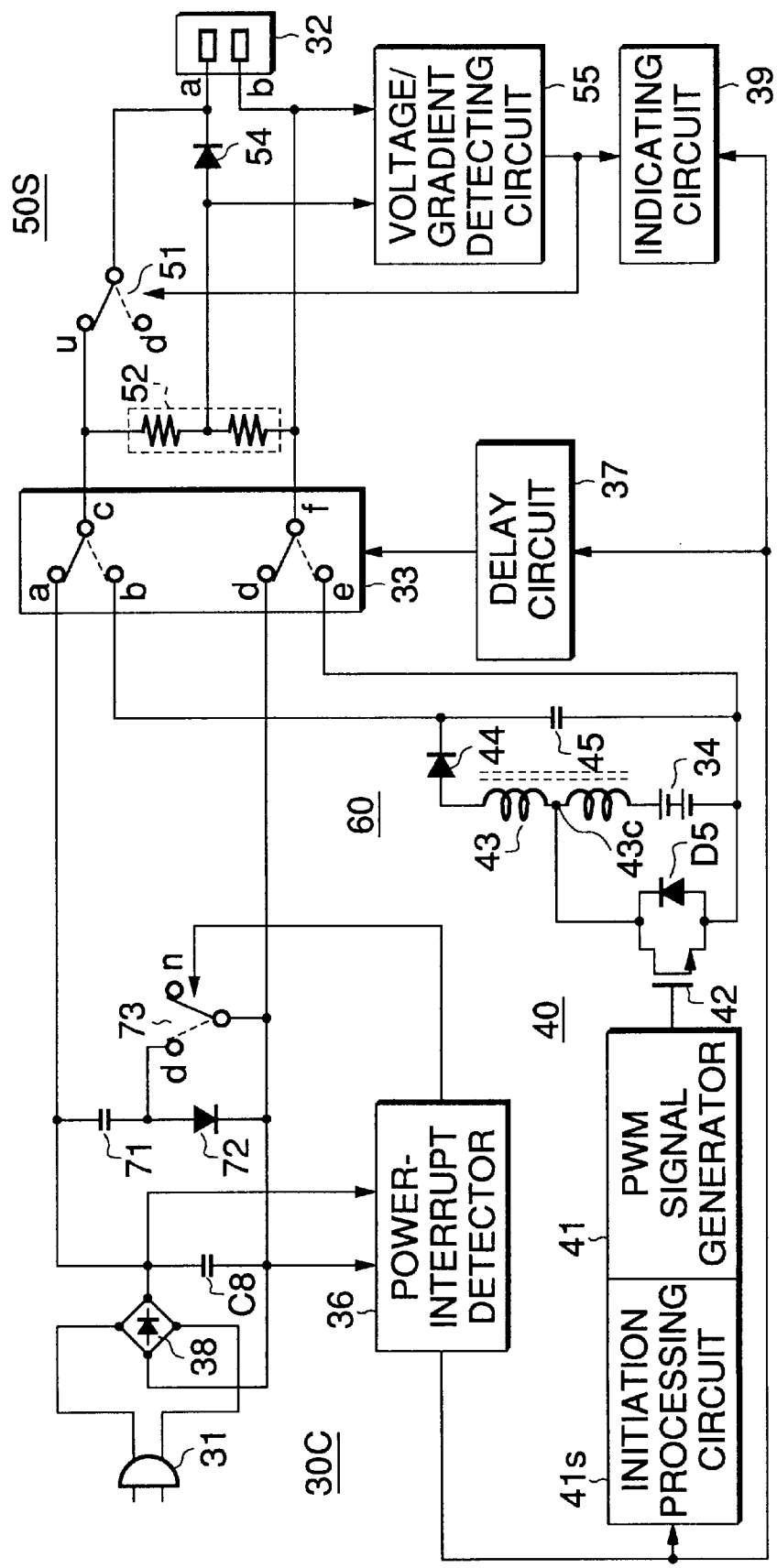
FIG. 11 is a block diagram for schematically representing a circuit arrangement of an auxiliary power supply apparatus according to a third embodiment of the present invention.
Figure 12:
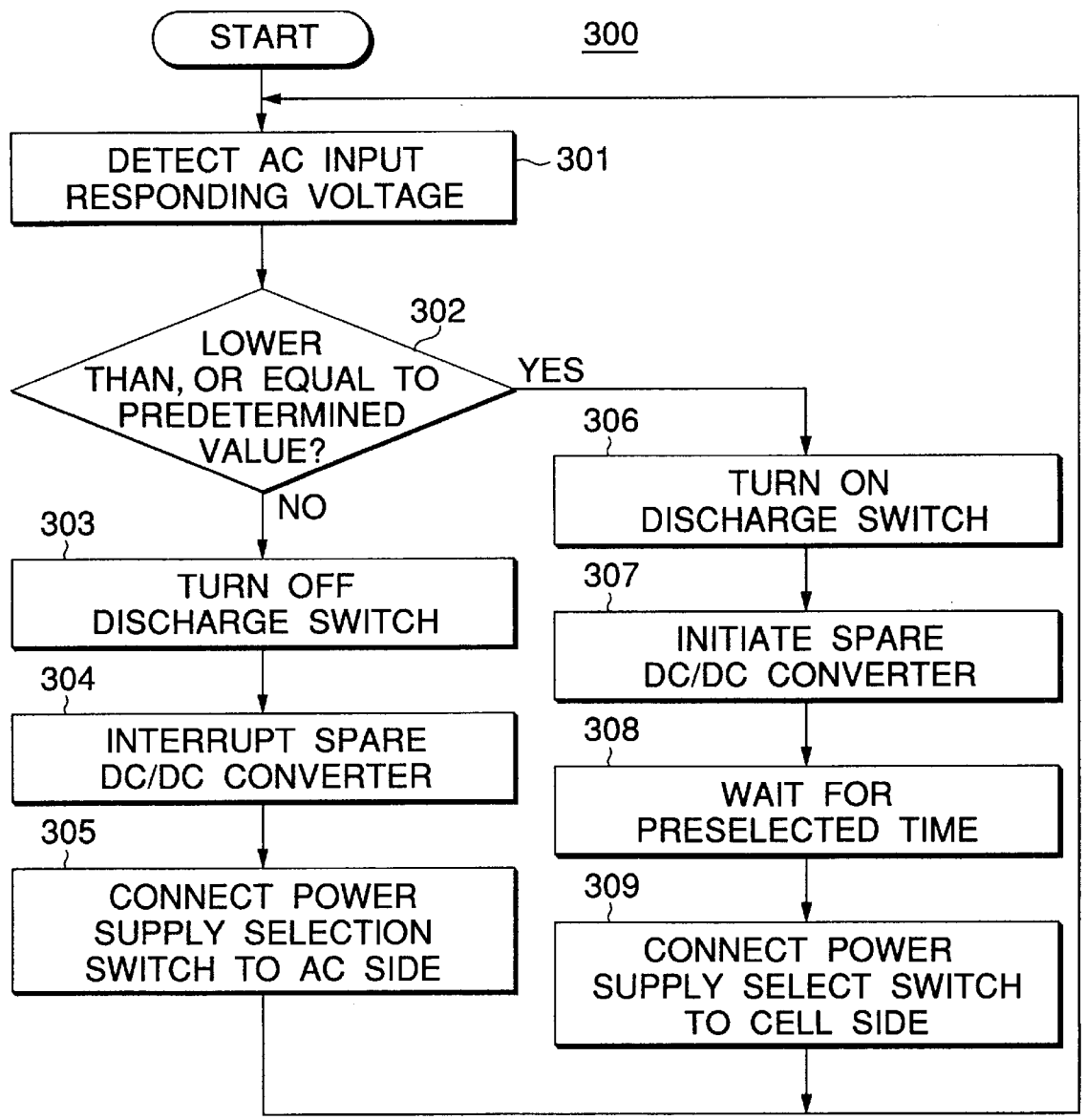
FIG. 12 is a flow chart for explaining a power-supply switching process operation of the auxiliary power supply apparatus according to the third embodiment.
Figure 13:
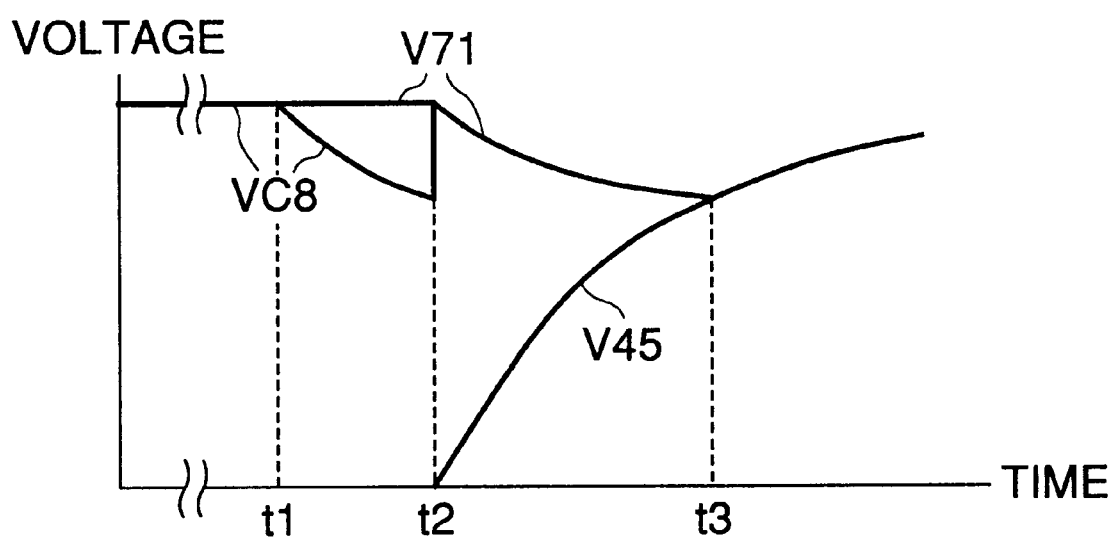
FIG. 13 is a waveform diagram for explaining the power-supply switching process operation of FIG. 11.

Referring now to FIG. 11 to FIG. 13, a description will be made of an auxiliary power supply apparatus according to a third embodiment of the present invention.

A circuit arrangement of the auxiliary (spare) power supply apparatus according to the third embodiment of the present invention is indicated in FIG. 11. It should be understood that the same reference numerals shown in FIG. 9 will be employed as those for denoting the same, or similar circuit portions of FIG. 11, and descriptions thereof will be partially omitted.

In an auxiliary power supply apparatus 30C of FIG. 11, the AC input terminal of the diode bridge 38 is connected to the AC plug 31, and the DC output terminal of this diode bridge 38 is connected both the a-sided fixed contact and the d-sided fixed contact of the dual-polarity/dual-switch type selection switch 33.

Also, the smoothing capacitor C8 and the power-interrupt detecting circuit 36 are connected to the DC output terminal of the diode bridge 38. The output of this detecting circuit 36 is supplied via a delay circuit 37 to the selection switch 33 as a switching control signal, and also is supplied as a control signal to the display element 39 and the initiation processing circuit 41s of the DC/DC converter 40 for the auxiliary purpose.

Also, in the DC/DC converter 40, the PWM signal generated from the PWM signal generating circuit 41 combined with the initiation processing circuit is supplied to the gate of the field-effect transistor (FET) 42 whose source is grounded, and the drain of this field-effect transistor 42 is connected to the center tap 43c of the step-up transformer 43.

The anode of the rectifier diode 44 is connected to one end of the step-up transformer 43, the secondary battery 34 is connected between the other end of the step-up transformer 43 and the source of the field-effect transistor 42, and further the smoothing capacitor 45 is connected between the cathode of the rectifier diode 44 and the source of the field-effect transistor 42. Both the b-sided fixed contact and the e-sided fixed contact of the selection switch 33 are connected between the both ends of this smoothing capacitor 45.

Then, in the load judging circuit 50S of the third embodiment, the u-sided fixed contact of the load connection switch 51 is connected to the c-sided movable contact of the selection switch 33, the movable contact of the connection switch 51 is connected to the a-sided terminal of the plug-socket type output connector 32, and the f-sided movable contact of the selection switch 33 is connected to the b-sided terminal of the output connector 32. It should also be noted that the d-sided fixed contact of the connection switch 51 is not connected to any point.

The resistor voltage divider 52 is connected between the c-sided movable contact and the f-sided movable contact of the selection switch 33, and the diode 54 is series-connected between the center point of this voltage divider 52 and the a-sided terminal of the output connector 32.

The voltage/gradient detecting circuit 55 is connected to the center point of the voltage divider 52 and the b-sided terminal of the output connector 32. The detection output from the voltage/gradient detecting circuit 55 is applied as a control signal to the load connection switch 51 and the display element 39.

Furthermore, in accordance with this third embodiment, one end of a capacitor 71 is connected to one terminal of the DC output terminals of the diode bridge 38 in order to support the rising operation of the DC/DC converter 40 for the auxiliary purpose during the occurrence of the power interruption. The other end of this capacitor 71 is connected via an anode-to-cathode path of a discharge preventing diode 72 to the other terminal of the DC output terminals of the diode bridge 38. Both a d-sided fixed contact of another selection switch 73 and a movable contact thereof are connected to the anode and the cathode of this diode 72. An n-sided fixed contact of this switch 73 is not connected to any point. The output of the power-interrupt detecting circuit 36 is supplied as a control signal to the switch 73.

It should be noted that a capacity of the capacitor 71 is substantially equal to the capacity of the smoothing capacitor C8, for example, selected to be approximately 100 $\mu$F.

It should also be noted that although the discharge switch 73 is illustrated as a single-polarity/dual-switch type switch, for the sake of easy explanation, this discharge switch 73 may be constituted as a semiconductor switch.

(POWER-SUPPLY SWITCHING PROCESS OPERATION OF THIRD EMBODIMENT]

Referring also to FIG. 12 to FIG. 13, the power-supply switching process operation according to the first embodiment of the present invention will now be explained.

Under an initial condition, it is now assumed that the selection switch 33 and the discharge switch 73 are connected as represented by a solid line in FIG. 11, the load connection switch 51 is connected by a dotted line in FIG. 11.

Then, when the AC plug 31 of the auxiliary power supply apparatus 30C shown in FIG. 11 is inserted into the plug socket (not shown) of the commercial AC power supply, and also the AC plug of the load set of the switching type power supply is inserted into the output connector 32, as indicated in FIG. 2, the process operations defined at the steps 104, 105, and 111 among the routine 100 shown in FIG. 7 are carried out by the voltage/gradient detecting circuit 55. Then, it is assumed that the load connection switch 51 is switched, as indicated by a solid line of FIG. 11.

When the power-supply switching process routine 300 as indicated in FIG. 12 is started, at a first step 301, a terminal voltage of the capacitor C8 in correspondence with the AC input is detected. Then, this process operation is advanced to a step 302 at which a check is made as to whether or not this terminal voltage is lower than, or equal to a predetermined value.

When the terminal voltage across the capacitor C8 is not lower than, or equal to a predetermined value at the step 302, namely when the commercial AC power supply is not brought into the power interrupt state, the process operation is advanced to a step 303. At this step 303, the discharge switch 73 is turned OFF, so that the supporting capacitor 71 is charged by the DC output of the diode bridge 38.

At a next step 304, the DC/DC converter 40 for the auxiliary purpose is brought into the rest condition, and the process operation is advanced to a step 305. At this step 305, the power-supply selection switch 33 is connected to the AC side, as indicated by a solid line of FIG. 11. As a result, the electric power from the AC side produced by the diode bridge 38 is conducted to the output connector 32, and then the process operation is returned to the previous step 301.

Conversely, when the voltage corresponding to the AC input is lower than, or equal to a predetermined value, namely when the commercial AC power supply is brought into the power interrupt condition at the step 302, the process operation is advanced to a step 306 at which the discharge switch 72 is turned ON. At a step 307, the DC/DC converter 40 for auxiliary purposes is initiated.

Assuming now that the commercial AC power supply is brought into the power interruption state at a time instant "t" of FIG. 13, the terminal voltage VC8 of the capacitor C8 starts to be lowered, and then this voltage drop is detected by the power-interrupt detecting circuit 36 at a time instant t2.

In response to this detection result, as indicated by a dotted line of FIG. 11, when the discharge switch 72 is turned ON, the electron charge stored in the capacitor 71 starts to be discharged, so that the terminal voltage V71 of the capacitor 71 starts to be lowered.

On the other hand, the DC/DC converter 40 is initiated. The output voltage of this converter 40, namely the terminal voltage V45 of the capacitor 45 starts to be increased from a time instant t2, and is reached to a preselected voltage at a time instant t3.

As a consequence, at a step 308, the system operation waits for a preselected time period of, for example, several hundreds of milliseconds defined from the time instant t2 to the time instant t3. Thereafter, the process operation is advanced to a step 309 at which the power supply selection switch 33 is connected to the cell side, as indicated by a dotted line of FIG. 11, so that the electric power derived from the cell and produced by the DC/DC converter 40 is conducted to the output connector 32. Then, the process operation is returned to the step 301 at which the above-described process operation is repeatedly performed.

It should be understood that the delay circuit 37 shown in FIG. 11 corresponds to the time waiting operation defined at the step 308.

Although not shown in the drawing, the conditions defined at the step 305 and the step 309 may be properly displayed by using the display element 39 in a similar manner to that of the previous embodiments.

In accordance with the above-described third embodiment, the load judging circuit 50S judges as to whether or not the load set is properly connected to the output connector, and the DC electric power is supplied only to such a load set adapted to the power supply circuit. As a consequence, the electric power can be safely and firmly supplied to the suitable electric appliances which constitute the load.

Also, when the power interruption happens to occur, the electric charge stored in the supporting capacitor 71 is discharged so as to support the rising operation of switching type the DC/DC converter 40 for the auxiliary purpose. As a consequence, the compact auxiliary power supply apparatus can be operated in a high efficiency, and furthermore, the switching operation during the power interruption can be smoothly carried out.

ARRANGEMENT OF FOURTH EMBODIMENT]

Figure 14:
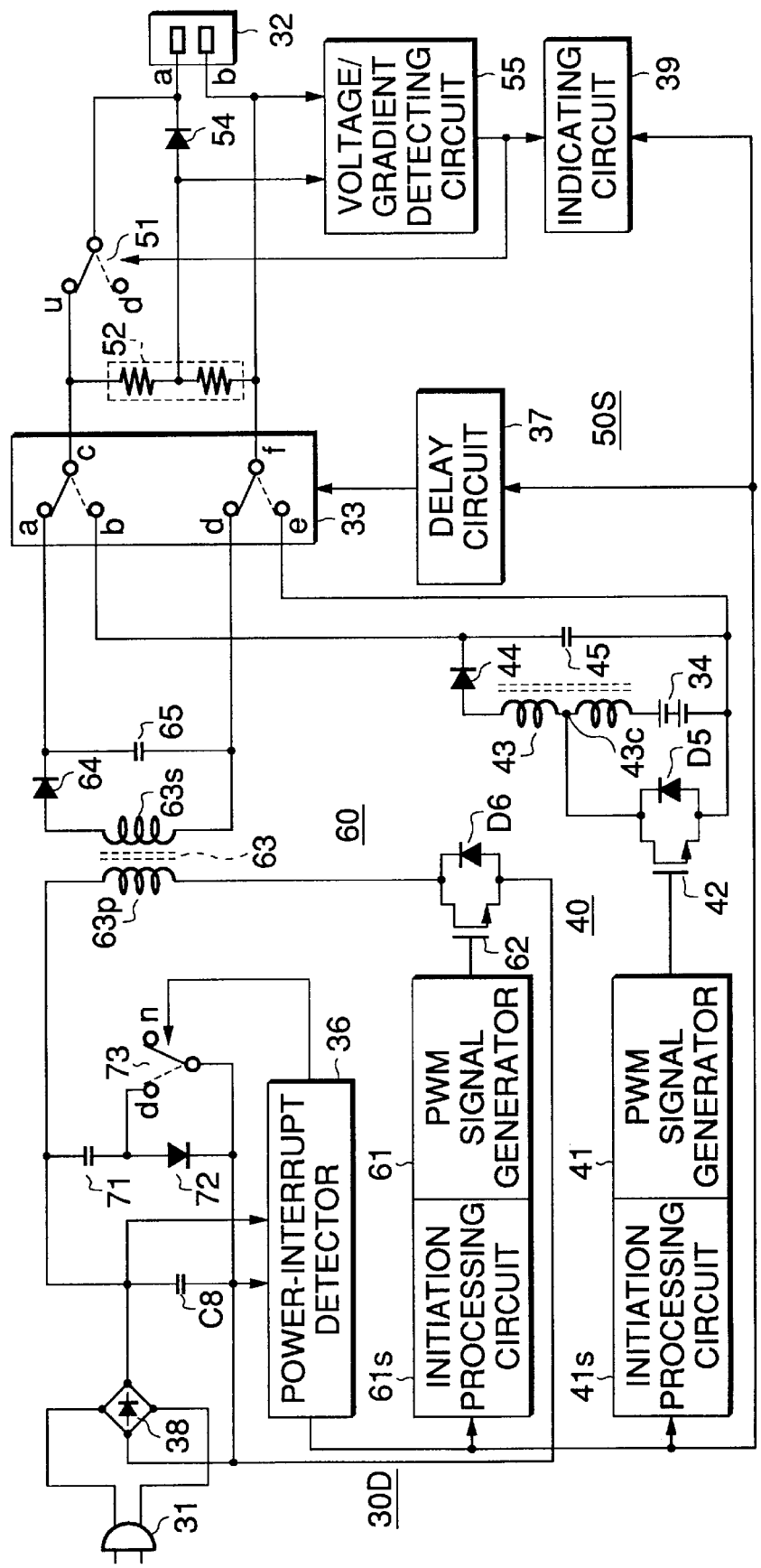
FIG. 14 is a block diagram for schematically representing a circuit arrangement of an auxiliary power supply apparatus according to a fourth embodiment of the present invention.

Referring now to FIG. 14, a description will be made of an auxiliary power supply apparatus according to a fourth embodiment of the present invention.

A circuit arrangement of the auxiliary (spare) power supply apparatus according to the fourth embodiment of the present invention is indicated in FIG. 14. It should be understood that the same reference numerals shown in FIG. 4, FIG. 9, and FIG. 11 will be employed as those for denoting the same, or similar circuit portions of FIG. 14, and descriptions thereof will be partially omitted.

An auxiliary power supply apparatus 30D of FIG. 14 is arranged in such a manner that such a normally operable DC/DC converter 60 as shown in FIG. 9 is added to the above-explained auxiliary power supply apparatus 30C shown in FIG. 11.

In other words, in the auxiliary power supply apparatus 30D of FIG. 14, the AC input terminal of the diode bridge 38 is connected to the AC plug 31. Also, the smoothing capacitor C8 and the power-interrupt detecting circuit 36 are connected to the DC output terminal of the diode bridge 38. The output of this detecting circuit 36 is supplied via the delay circuit 37 to the selection switch 33 as a switching control signal, and also is supplied as a control signal to the display element 39 and the respective initiation processing circuits 41s and 61s of the DC/DC converter 40 for the auxiliary purpose, and the normally operable DC/DC converter 60.

In the normally operable DC/DC converter 60, one end of the primary winding 63p of the switching transformer 63 is connected to the DC output terminal of the diode bridge 38. The PWM signal generated from the PWM signal generating circuit 61 combined with the initiation processing circuit is supplied to the gate of the field-effect transistor (FET) 62 whose source is grounded, and the drain of this field-effect transistor 62 is connected to the other end of the primary winding 63p of the switching transformer 63.

The anode of the rectifier diode 64 is connected to one end of a secondary winding 63s of the switching transformer 63. A smoothing capacitor 65 is connected between the cathode of the rectifier diode 64 and the other end of the secondary winding 63s. Both ends of this capacitor 65 are connected to the a-sided fixed contact and the d-sided fixed contact of the dual-plurality/dual-switch type selection switch 33.

Also, in the DC/DC converter 40 for the auxiliary purpose, the PWM signal generated from the PWM signal generating circuit 41 combined with the initiation processing circuit is supplied to the gate of the field-effect transistor (FET) 42 whose source is grounded, and the drain of this field-effect transistor 42 is connected to the center tap 43c of the step-up transformer 43.

The anode of the rectifier diode 44 is connected to one end of the step-up transformer 43, the secondary battery 34 is connected between the other end of the step-up transformer 43 and the source of the field-effect transistor 42, and further the smoothing capacitor 45 is connected between the cathode of the rectifier diode 44 and the source of the field-effect transistor 42.

Both the b-sided fixed contact and the e-sided fixed contact of the selection switch 33 are connected between the both ends of this smoothing capacitor 45.

Then, in the load judging circuit 50S of the fourth embodiment, the u-sided fixed contact of the load connection switch 51 is connected to the c-sided fixed contact of the selection switch 33, the movable contact of the load connection switch 51 is connected to the a-sided terminal of the plug-socket type output connector 32, and the f-sided movable contact of the selection switch 33 is connected to the b-sided terminal of the output connector 32. It should also be noted that the d-sided fixed contact of the connection switch 51 is not connected to any point.

The resistor voltage divider 52 is connected between the c-sided movable contact and the f-sided movable contact of the selection switch 33, and the diode 54 is series-connected between the center point of this voltage divider 52 and the a-sided terminal of the output connector 32.

The voltage/gradient detecting circuit 55 is connected to the center point of the voltage divider 52 and the b-sided terminal of the output connector 32. The detection output from the voltage/gradient detecting circuit 55 is applied as a control signal to the load connection switch 51 and the display element 39.

Furthermore, in accordance with this fourth embodiment, one end of a capacitor 71 is connected to one terminal of the DC output terminals of the diode bridge 38 in order to support the rising operation of the DC/DC converter 40 for the auxiliary purpose during the occurrence of the power interruption. The other end of this capacitor 71 is connected via an anode-to-cathode path of a discharge preventing diode 72 to the other terminal of the DC output terminals of the diode bridge 38. Both a d-sided fixed contact of another selection switch 73 and a movable contact thereof are connected to the anode and the cathode of this diode 72. An n-sided fixed contact of this switch 73 is not connected to any point. The output of the power-interrupt detecting circuit 36 is supplied as a control signal to the switch 73.

It should be noted that a capacity of the capacitor 71 is substantially equal to the capacity of the smoothing capacitor C8, for example, selected to be approximately 100 μF.

Also, in this fourth embodiment of FIG. 14, a power supply switching process routine 300 indicated in a flow chart of FIG. 12 is executed, and when the power interruption happens to occur, the electric charge stored in the supporting capacitor 71 is discharged so as to support the rising operation of switching type the DC/DC converter 40 for the auxiliary purpose. As a consequence, the compact auxiliary power supply apparatus can be operated in a high efficiency, and furthermore, the switching operation during the power interruption can be smoothly carried out.

Also, the load judging circuit 50S judges as to whether or not the load set is properly connected to the output connector, and the DC electric power is supplied only to such a load set adapted to the power supply circuit. As a consequence, the electric power can be safely and firmly supplied to the suitable electric appliances which constitute the load.

Then, since the normally operable DC/DC converter 60 is employed, the auxiliary power supply apparatus of this embodiment may be readily adapted to the commercial AC power supplies having the various voltages.

[ARRANGEMENT OF FIFTH EMBODIMENT]

Figure 15:
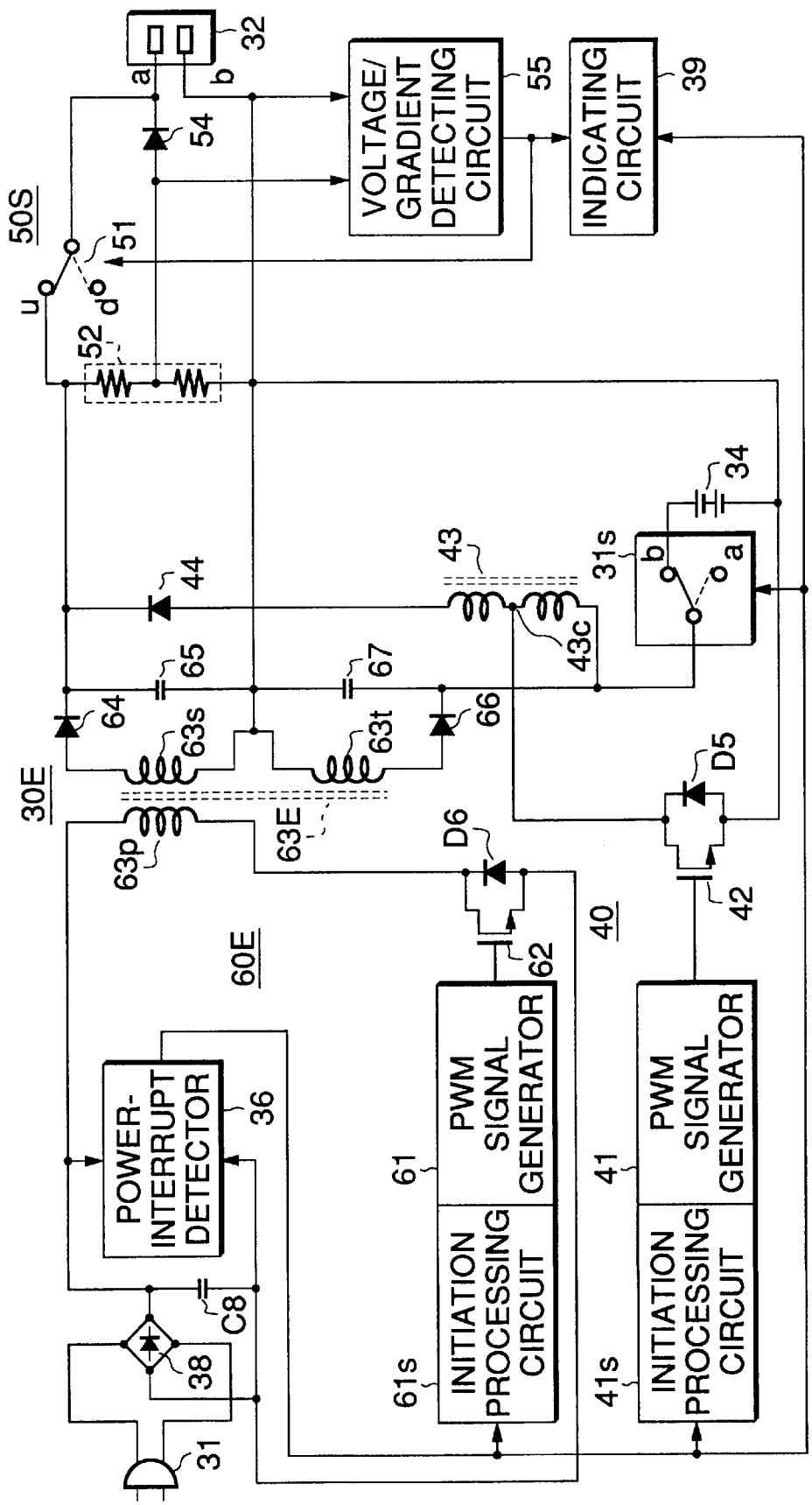
FIG. 15 is a block diagram for schematically representing a circuit arrangement of an auxiliary power supply apparatus according to a fifth embodiment of the present invention.
Figure 16:
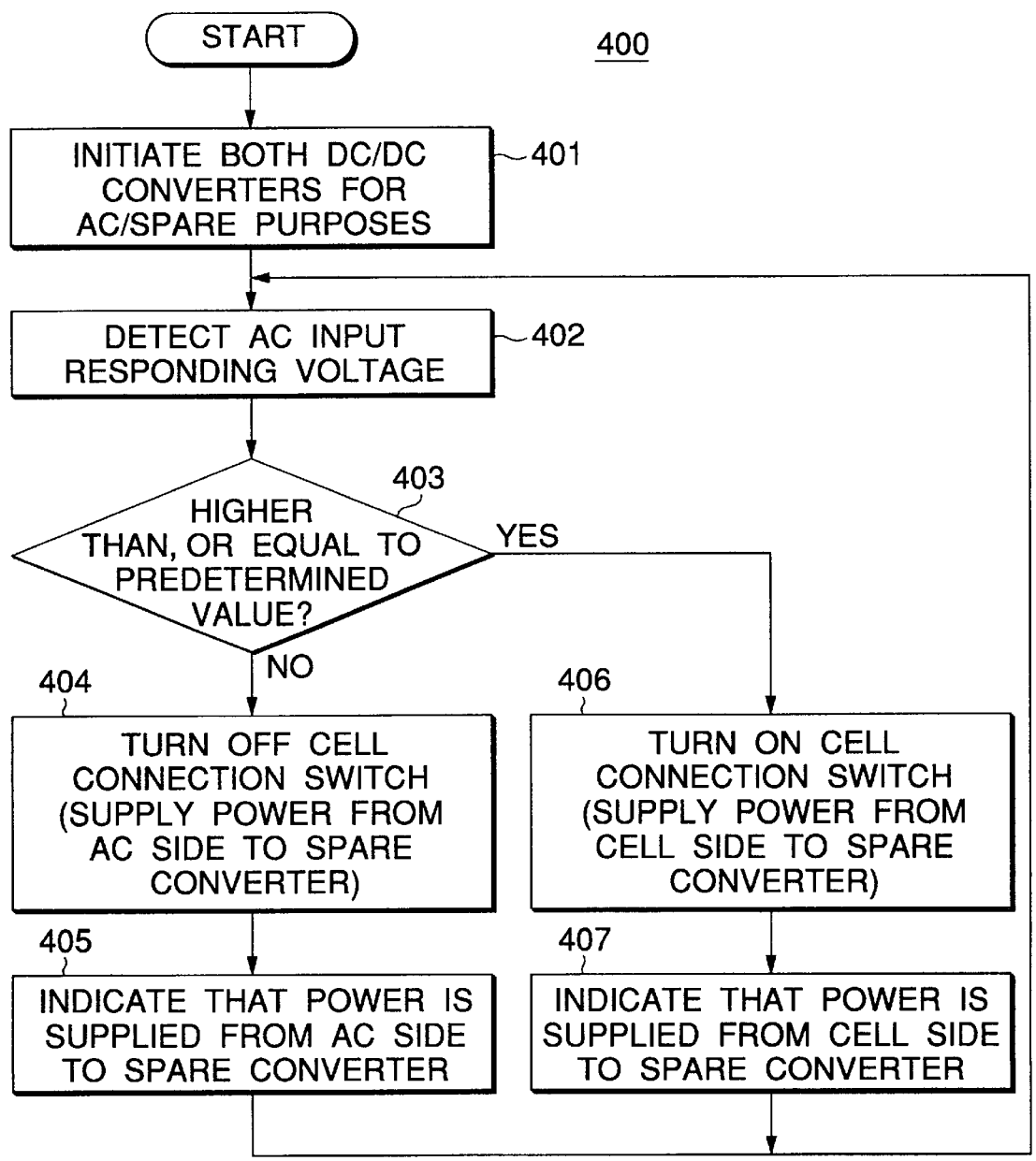
FIG. 16 is a flow chart for explaining a power-supply switching process operation of the auxiliary power supply apparatus according to the fifth embodiment.

Referring now to FIG. 15 to FIG. 16, a description will be made of an auxiliary power supply apparatus according to a fifth embodiment of the present invention.

A circuit arrangement of the auxiliary (spare) power supply apparatus according to the fifth embodiment of the present invention is indicated in FIG. 15. It should be understood that the same reference numerals shown in FIG. 4, FIG. 9, FIG. 12, and FIG. 14 will be employed as those for denoting the same, or similar circuit portions of FIG. 15, and descriptions thereof will be partially omitted.

In an auxiliary power supply apparatus 30E of FIG. 15, a DC voltage substantially equal to the voltage V34 of the secondary cell 34, and also the DC voltage derived from the cell are applied to the DC/DC converter 40 for the auxiliary purpose, so that the power supply apparatuses can be further smoothly switched during the occurrence of the power interruption. The first-mentioned DC voltage is produced by rectifying an output from a third winding 63t of a switching transformer 63E of a normally operable DC/DC converter 60E, to which the AC power is supplied from the power supply.

In other words, in the auxiliary power supply apparatus 30E of FIG. 15, the AC input terminal of the diode bridge 38 is connected to the AC plug 31, whereas the smoothing capacitor C8 and the power-interrupt detecting circuit 36, and further one end of a primary winding 63p of the switching transformer 63E employed in a normally operable DC/DC converter 60E are connected to the DC output terminal of this diode bridge 38.

In the normally operable DC/DC converter 60E according to this fifth embodiment, a PWM signal generated from a PWM signal generating circuit 61 combined with an initiation processing circuit is supplied to the source of the field-effect transistor (FET) 62 whose source is grounded, and a drain of this field-effect transistor 62 is connected to the other end of the primary winding 63p of the switching transformer 63.

The anode of the rectifier diode 64 is connected to one end of the secondary winding 63s of the switching transformer 63E. A smoothing capacitor 65 is connected between the cathode of the rectifier diode 64 and the other end of the secondary winding 63s.

A terminal voltage V65 of this capacitor 65 becomes, for example, approximately 120V when the voltage of the commercial AC power supply is equal to 100V.

In this fifth embodiment, the u-sided fixed contact of the load connection switch 51 of the load judging circuit 50S is connected to one end of the capacitor 65. The movable contact of the connection switch 51 is connected to the a-sided terminal of the plug-socket type output connector 32, and the other end of the capacitor 65 is connected to the b-sided terminal of the output connector 32. It should also be noted that the d-sided fixed contact of the connection switch 51 is not connected to any point.

The resistor voltage divider 52 is connected between both ends of the capacitor 65, and the diode 54 is connected between the center point of this voltage divider 52 and the a-sided terminal of the output connector 32. Then, the voltage/gradient detecting circuit 55 is connected to the center point of the voltage divider 52 and the b-sided terminal of the output connector 32. The detection output from the voltage/gradient detecting circuit 55 is applied as a control signal to the load connection switch 51 and the display element 39.

Also, in this fifth embodiment, the third winding 63t is provided with the switching transformer 63E. The anode of the rectifier diode 66 is connected to one end of this third winding 63t, and a smoothing capacitor 67 is connected between the cathode of the rectifier diode 66 and the other end of the third winding 63t.

For instance, when the voltage of the commercial AC power supply is equal to 100V, the terminal voltage V67 of this capacitor 67 becomes substantially equal to the voltage V34 of the secondary cell 34 under loaded condition.

Then, in this fifth embodiment, the cathode of the rectifier diode 44 switch is connected to one end of the step-up transformer 43 of the DC/DC converter 40 for the auxiliary purpose is connected to the cathode of the rectifier diode 65 which is connected to one end of the secondary winding 63s of the switching transformer 63E employed in the normally operable DC/DC converter 60E. Also, a cathode of a rectifier diode 66 which is connected to one end of the third winding 63t of the switching transformer 63E is connected to the other end of the step-up transformer 43.

To the other end of this step-up transformer 43, the secondary battery 34 is connected through a movable contact of a cell connection switch 33S and a b-sided fixed contact thereof. An a-sided fixed contact of this switch 33S is not connected to any point. The detection output of the power-interrupt detecting circuit 36 is supplied as a control signal to the cell connection switch 33S.

Also, in the DC/DC converter 40 for the auxiliary purpose, the PWM signal generated from the PWM signal generating circuit 41 combined with the initiation processing circuit is supplied to the gate of the field-effect transistor (FET) 42 whose source is grounded, and the drain of this field-effect transistor 42 is connected to the center tap 43c of the step-up transformer 43.

The detection output from the power-interrupt detecting circuit 36 is supplied as control signals for the initiation operation and the display operation to the DC/DC converter 40 for the auxiliary purpose, and the normally operable DC/DC converter 60, and also the display element 39.

[POWER-SUPPLY SWITCHING PROCESS OPERATION OF FIFTH EMBODIMENT]

Referring also to FIG. 16, the power-supply switching process operation according to the fifth embodiment of the present invention will now be explained.

Under an initial condition, it is now assumed that the cell connection switch 33S and the load connection switch 51 are connected as represented by a dotted line in FIG. 15.

Then, when the AC plug 31 of the auxiliary power supply apparatus 30E shown in FIG. 15 is inserted into the plug socket (not shown) of the commercial AC power supply, and also the AC plug of the load set of the switching type power supply is inserted into the output connector 32, as indicated in FIG. 2, the process operations defined at the steps 104, 105, and 111 among the routine 100 shown in FIG. 7 are carried out by the voltage/gradient detecting circuit 55. Then, it is assumed that the load connection switch 51 is switched, as indicated by a solid line of FIG. 15.

When a power-supply switching process routine 400 as indicated in FIG. 16 is started, at a first step 401, both the DC/DC converter 40 for the auxiliary purpose and the normally operable DC/DC converter 60 are initiated. At a next step 402, a terminal voltage of the capacitor C8 in correspondence with the AC input is detected. Then, this process operation is advanced to a step 403 at which a check is made as to whether or not this terminal voltage is lower than, or equal to a predetermined value.

When the terminal voltage across the capacitor C8 is not lower than, or equal to a predetermined value at the step 403, namely when the commercial AC power supply is not brought into the power interrupt state, the process operation is advanced to a step 404. At this step 404, the cell connection switch 33S is turned OFF.

As a consequence, the electric power is supplied from the AC side to the DC/DC converter 40 for the auxiliary purpose, which is obtained by rectifying the output from the third winding 63t of the switching transformer 63E employed in the normally operable DC/DC converter 60E, so that both the DC/DC converter 40 for the auxiliary purpose and the normally operable DC/DC converter 60E are commonly operated.

At a next step 405, such a fact that the electric power is supplied from the AC side to the DC/DC converter 40 for the auxiliary purpose is displayed by, for example, continuously turning ON the green light. Then, the process operation is returned to the step 402 at which the process operations defined from the step 403 to the step 405 are repeatedly carried out.

Conversely, when the terminal voltage of the capacitor C8 is lower than, or equal to a predetermined value, namely when the commercial AC power supply is brought into the power interrupt condition at the step 403, the process operation is advanced to a step 406 at which the cell connection switch 33S is turned ON, the electric power from the cell 34 is supplied to the DC/DC converter 40 for auxiliary purpose, so that this DC/DC converter 40 for the auxiliary purpose is continuously operated. In this case, apparently, the operation of the normally operable DC/DC converter 60E is stopped.

At a subsequent step 407, such a fact that the electric power is supplied from the cell side to the DC/DC converter 40 for the auxiliary purpose is displayed by, for instance, continuously turning ON the red light. Then, the process operation is returned to the step 402, at which the process operations defined by the steps 403, 406, and 407 are repeatedly performed.

In accordance with the above-described fifth embodiment, the load judging circuit 50S judges as to whether or not the load set is properly connected to the output connector, and the DC electric power is supplied only to such a load set adapted to the power supply circuit. As a consequence, the electric power can be safely and firmly supplied to the suitable electric appliances which constitute the load.

Also, while the normally operable DC/DC converter 60E is under operation, the electric power is supplied from the AC side to the switching type DC/DC converter 40 for the auxiliary purpose to which the electric power is supplied from the cell side. The first-mentioned electric power is produced by rectifying the output from the third winding 63t of this switching transformer 63E. As a consequence, the compact auxiliary power supply apparatus can be operated in a high efficiency, and furthermore, the switching operation during the power interruption can be smoothly carried out.

[ARRANGEMENT OF SIXTH EMBODIMENT]

Figure 17:
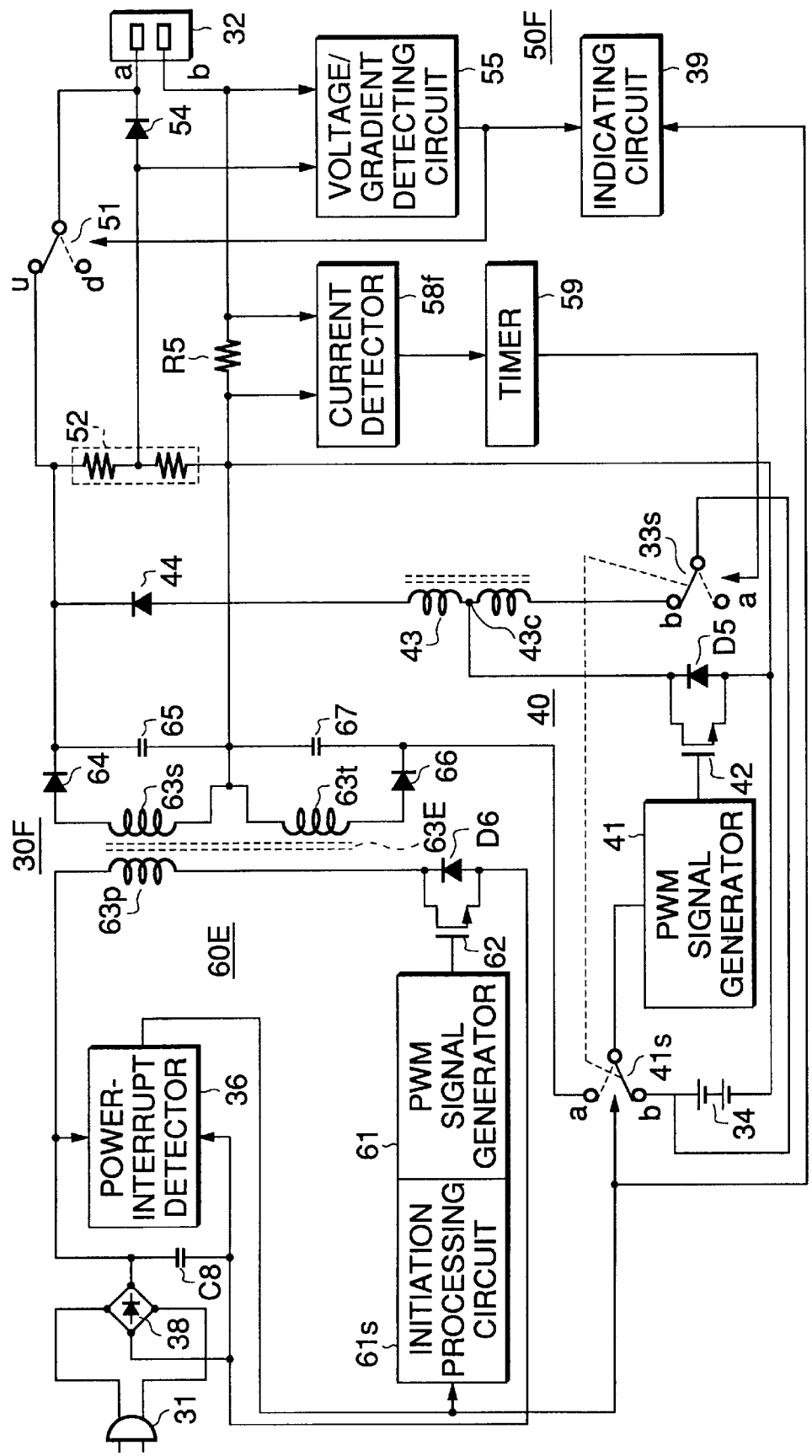
FIG. 17 is a block diagram for schematically representing a circuit arrangement of an auxiliary power supply apparatus according to a sixth embodiment of the present invention.
Figure 18:
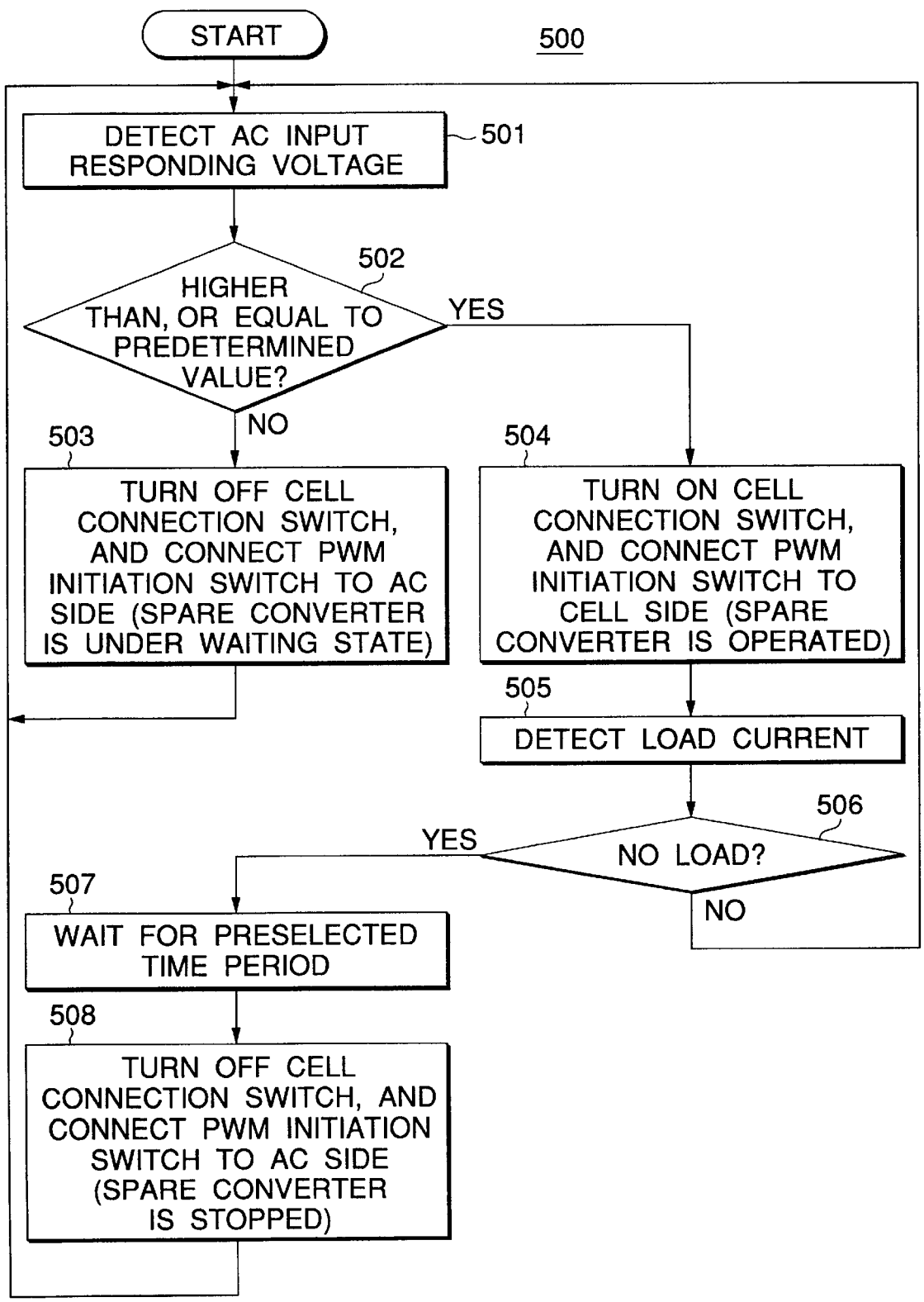
FIG. 18 is a flow chart for explaining a power-supply switching process operation of the auxiliary power supply apparatus according to the sixth embodiment.

Referring now to FIG. 17 to FIG. 18, a description will be made of an auxiliary power supply apparatus according to a sixth embodiment of the present invention.

A circuit arrangement of the auxiliary (spare) power supply apparatus according to the sixth embodiment of the present invention is indicated in FIG. 17. It should be understood that the same reference numerals shown in FIG. 4, FIG. 9, FIG. 11, FIG. 14, and FIG. 15 will be employed as those for denoting the same, or similar circuit portions of FIG. 17, and descriptions thereof will be partially omitted.

In an auxiliary power supply apparatus 30F of FIG. 17, a DC voltage substantially equal to the voltage V34 of the secondary cell 34, and also the DC voltage derived from the cell are applied to the PWM signal generating circuit 41 of the DC/DC converter 40 for the auxiliary purpose, so that the power supply apparatuses can be further smoothly switched during the occurrence of the power interruption. The first-mentioned DC voltage is produced by rectifying the output from the third winding 63t of the switching transformer 63E of the normally operable DC/DC converter 60E.

Also, when a power interruption happens to occur, a load judging circuit 50F detects as to whether or not a load is present. In the case of no load, the operation of the DC/DC converter 40 for the auxiliary purpose is stopped, so that the useless power discharge of the cell can be avoided.

In other words, in the auxiliary power supply apparatus 30F of FIG. 17, the AC input terminal of the diode bridge 38 is connected to the AC plug 31, whereas the smoothing capacitor C8 and the power-interrupt detecting circuit 36, and further one end of the primary winding 63p of the switching transformer 63E employed in the normally operable DC/DC converter 60E are connected to the DC output terminal of this diode bridge 38.

In the normally operable DC/DC converter 60E, the PWM signal generated from the PWM signal generating circuit 61 combined with the initiation processing circuit is supplied to the gate of the field-effect transistor (FET) 62 whose source is grounded, and a drain of this field-effect transistor 62 is connected to the other end of the primary winding 63p of the switching transformer 63E.

The anode of the rectifier diode 64 is connected to one end of the secondary winding 63s of the switching transformer 63E. The smoothing capacitor 65 is connected between the cathode of the rectifier diode 64 and the other end of the secondary winding 63s.

A terminal voltage V65 of this capacitor 65 becomes, for example, approximately 120V when the voltage of the commercial AC power supply is equal to 100V.

In this sixth embodiment, the u-sided fixed contact of the load connection switch 51 of the load judging circuit 50F is connected to one end of the capacitor 65, the movable contact of the connection switch 51 is connected to the a-sided terminal of the plug-socket type output connector 32, and the other end of the capacitor 65 is connected via the current detecting resistor R5 to the a-sided terminal of the output connector 32. It should also be noted that the d-sided fixed contact of the connection switch 51 is not connected to any point.

The resistor voltage divider 52 is connected between both ends of the capacitor 65, and the diode 54 is connected between the center point of this voltage divider 52 and the a-sided terminal of the output connector 32. Then, the voltage/gradient detecting circuit 55 is connected to the center point of the voltage divider 52 and the b-sided terminal of the output connector 32, and a current detecting circuit 58f is connected across the resistor R5. The detection output from the voltage/gradient detecting circuit 55 is applied as a control signal to the load connection switch 51 and the display element 39. Also, the output from the current detecting circuit 58f is supplied to a timer 59.

Also, in this sixth embodiment, the third winding 63t is provided with the switching transformer 63E. The anode of the rectifier diode 66 is connected to one end of this third winding 63t, and a smoothing capacitor 67 is connected between the cathode of the rectifier diode 66 and the other end of the third winding 63t.

For instance, when the voltage of the commercial AC power supply is equal to 100V, the terminal voltage V67 of this capacitor 67 becomes subsequentially equal to the voltage V34 of the secondary cell 34 under loaded condition.

Then, in this sixth embodiment, the cathode of the rectifier diode 44 which is connected to one ed of the step-up transformer 43 of the DC/DC converter 40 for the auxiliary purpose is connected to the cathode of the rectifier diode 65 which is connected to one end of the secondary winding 63S of the switching transformer 63E employed in the normally operable DC/DC converter 60E. Also, a cathode of a rectifier diode 66 which is connected to one end of the third winding 63t of the switching transformer 63E is connected to the other end of the step-up transformer 43.

To the other end of this step-up transformer 43, the secondary battery 34 is connected through a movable contact of a cell connection switch 33S and a b-sided fixed contact thereof. An a-sided fixed contact of this switch 33S is not connected to any point. The output of the timer 59 is supplied as a control signal to the cell connection switch 33S.

Also, in the DC/DC converter 40 for the auxiliary purpose, the PWM signal generated from the PWM signal generating circuit 41 combined with an initiation processing circuit 41s, indicated as a selection switch, is supplied to the gate of the field-effect transistor (FET) 42 whose source is grounded, and the drain of this field-effect transistor 42 is connected to the center tap 43c of the step-up transformer 43.

Furthermore, according to this sixth embodiment, an a-sided fixed contact of the initiation switch 41s is connected to the cathode of the rectifier diode 66, and also the secondary battery 34 is connected to a b-sided fixed contact of this initiation switch 41s. Then, electric power for operations is supplied via a movable contact of this initiation switch 41s to the PWM signal generating circuit 41.

Also, the cell connection switch 33S is operable in combination with the initiation switch 41s. The detection output from the power-interrupt detecting circuit 36 is supplied as control signals for the initiation operation and the display operation to the initiation switch 41s, and the normally operable DC/DC converter 60, and also the display element 39.

[POWER-SUPPLY SWITCHING PROCESS OPERATION OF SIXTH EMBODIMENT]

Referring also to FIG. 18, the power-supply switching process operation according to the sixth embodiment of the present invention will now be explained.

Under an initial condition, it is now assumed that the cell connection switch 33S, the initiation switch 41s and the load connection switch 51 are connected as represented by a dotted line in FIG. 17.

Then, when the AC plug 31 of the auxiliary power supply apparatus 30F shown in FIG. 17 is inserted into the plug socket (not shown) of the commercial AC power supply, and also the AC plug of the load set of the switching type power supply is inserted into the output connector 32, as indicated in FIG. 2, the process operations defined at the steps 104, 105, and 111 among the routine 100 shown in FIG. 7 are carried out by the voltage/gradient detecting circuit 55. Then, it is assumed that the load connection switch 51 is switched, as indicated by a solid line of FIG. 17.

When a power-supply switching process routine 500 as indicated in FIG. 18 is started, at a first step 501, a terminal voltage of the capacitor C8 in correspondence with the AC input is detected. Then, this process operation is advanced to a step 502 at which a check is made as to whether or not this terminal voltage is lower than, or equal to a predetermined value.

When the terminal voltage across the capacitor C8 is not lower than, or equal to a predetermined value at the step 502, namely when the commercial AC power supply is not brought into the power interrupt state, the process operation is advanced to a step 503. At this step 503, the cell connection switch 33S is turned OFF, and also the movable contact of the initiation switch 41s of the PWM signal generating circuit 41 is connected to the a-sided fixed contact thereof.

As a consequence, the electric power is supplied from the AC side to the PWM signal generating circuit 41, which is obtained by rectifying the output from the third winding 63t of the switching transformer 63E employed in the normally operable DC/DC converter 60E. Also, since no electric power is supplied from the cell 34 to the field-effect transistor 42, the DC/DC converter 40 for the auxiliary purpose is brought into the waiting state.

Then, the process operation is returned to the step 501 at which the process operations defined up to the step 503 are repeatedly carried out.

Conversely, when the terminal voltage of the capacitor C8 is lower than, or equal to a predetermined value, namely when the commercial AC power supply is brought into the power interrupt condition at the step 502, the process operation is advanced to a step 504 at which the cell connection switch 33S is turned ON, and also the movable contact of the initiation switch 41s of the PWM signal generating circuit 41 is connected to the b-sided fixed contact.

As a result, the electric power derived from the cell 34 is supplied to both of the PWM signal generating circuit 41 and the field-effect transistor 42, so that the DC/DC converter 40 for the auxiliary purpose can be under operation state.

In this sixth embodiment, since the DC/DC converter 40 for the auxiliary purpose is set to the waiting state at the step 503, no longer the above-explained waiting time required to initiate the PWM signal generating circuit 41 is needed. Therefore, the DC/DC converters 40 can be smoothly changed with each other during the occurrence of the power interruption.

At a next step 505, a load current is detected. Then, the process operation is advanced to a further step 506. At this step 506, a check is made as to whether or not a no-load condition occurs. When it is so judged at this step 506 that the no-load condition does not occur, the process operation is returned to the step 501. Then, the process operations defined from the step 502 up to the steps 504 to 506 are repeatedly performed.

Conversely, when it is so judged at the step 506 that the no-load condition occurs, the process operation is advanced to a step 507 at which the system operation is brought into the waiting state defined by a preselected time period set by the timer 59. At the next step 508, the cell connection switch 33S is turned OFF, and further the movable contact of the initiation switch 41s of the PWM signal generating circuit 4 is connected to the a-sided fixed contact thereof.

As a result, the electric power derived from the cell 34 is not supplied to the field-effect transistor 42, but also the normally operable DC/DC converter 60E is not operated due to the power interruption, which may supply the electric power derived from the AC side to the PWM signal generating circuit 41. Accordingly, the DC/DC converter 40 is brought into the stop condition, so that the useless discharge of the cell power can be avoided when the power interruption happens to occur, and also there is no load.

Then, the process operation is returned to the step 501 at which the above-described process operations are repeatedly carried out.

It should be understood that although not shown in the drawing, the conditions defined at the step 503 and the step 504 may be properly displayed by employing the display element 39 in a similar manner to that of the above-described various embodiments.

In accordance with the above-described sixth embodiment, the load judging circuit 50F judges as to whether or not the load set is properly connected to the output connector, and the DC electric power is supplied only to such a load set adapted to the power supply circuit. As a consequence, the electric power can be safely and firmly supplied to the suitable electric appliances which constitute the load.

Also, while the normally operable DC/DC converter 60E is under operation, and also both the DC/DC converters 40 and 60E are used, the electric power produced by rectifying the output of the third winding 63t of the switching transformer 63E is supplied to the PWM signal generating circuit 41, so that the DC/DC converter 40 for the auxiliary purpose is brought into the waiting state. As a consequence, the compact auxiliary power supply apparatus can be operated in a high efficiency, and furthermore, the switching operation during the power interruption can be smoothly carried out.

Furthermore, the load judging circuit 50F judges as to whether or not there is the load while the power interruption happens to occur. Under the no-load condition, the operation of the DC/DC converter 40 for the auxiliary purpose is stopped, so that the useless power discharge from the cell can be prevented.

It should be understood that when a product is delivered and/or stocked, this condition is similar to the above-described no load condition and power-interrupt condition. As a result, the useless power discharge from the cell can be similarly avoided.

In the above-explained sixth embodiment, the electric power obtained by rectifying the output of the third winding 63t of the switching transformer 63E employed in the normally operable DC/DC converter 60E is also supplied to the PWM signal generating circuit 41 to thereby bring the DC/DC converter 40 for the auxiliary purpose into the waiting state. Alternatively, the electric power from the smoothing capacitor C8 may be supplied via a properly selected resistor to this PWM signal generating circuit 41.

As previously described in detail, in accordance with the present invention, the compact auxiliary power supply apparatus operable in the high efficiency can be accomplished which is capable of firmly and safely supplying the electric power to the electronic appliances adapted to the power supply circuits.

What is claimed is:

1. An auxiliary power supply apparatus for an electronic appliance connected to commercial AC power, the apparatus comprising:

an output connector connected to an AC plug of the electronic appliance employing commercial AC power as primary power;

power-interrupt detecting means for detecting an interruption of said commercial AC power;

a built-in cell for producing auxiliary power fed to said output connector in response to a detection result of said power-interrupt detecting means;

load discriminating means for discriminating a first kind of electronic appliance having a transformer type power supply circuit in which a primary winding of a transformer is connected to said AC plug connected to said output connector from a second kind of electronic appliance having a switching type power supply circuit connected to the AC plug connected to said output connector;

power producing means for producing power having a DC voltage substantially equal to a DC voltage produced by said switching type power supply circuit included in said second kind of electronic appliance while the electronic power is supplied from the commercial AC power;

auxiliary power producing means for producing auxiliary power having a DC voltage from said built-in cell, said DC voltage being substantially equal to the DC voltage produced from said switching type power supply circuit included in said second kind of electronic appliance; and power supply control means for selectively supplying one of said primary power and said auxiliary produced from said power producing means and said auxiliary power producing means to said second kind of electronic appliance having the switching type power supply circuit in response to outputs from said power-interrupt detecting means and said load discriminating means.

2. The auxiliary power supply apparatus as claimed in claim 1 wherein:

said load discriminating means includes means for applying a DC low voltage lower than said DC voltage produced by said switching type power supply via said output connector, and discriminates the type of the power supply circuit employed in said electronic appliance based upon a voltage change appearing at said output connector upon commencing applying said DC low voltage.

3. The auxiliary power supply apparatus as claimed in claim 1 wherein:

said power supply control means includes overcurrent/overpower detecting means for detecting one of overcurrent and overpower, and said power supply control means is controlled in response to a detection result of said overcurrent/overpower detecting means.

4. The auxiliary power supply apparatus as claimed in claim 1 wherein when the primary power is supplied from said commercial AC power, said power producing means is brought into an operation condition and said auxiliary power producing means is brought into an operation condition by the power produced by said power producing means; and when the interruption of the commercial AC power is detected by said power-interrupt detecting means, said auxiliary power producing means produces said auxiliary power from said built-in cell.

5. The auxiliary power supply apparatus as claimed in claim 1 wherein:

when the primary power is supplied from said commercial AC power, said power producing means is brought into an operation condition and said auxiliary power producing means is brought into a waiting condition by the power produced by said power producing means; and when the interruption of the commercial AC power is detected by said power-interrupt detecting means, said auxiliary power producing means produces said auxiliary power from said built-in cell.

* * * * *